US009100964B2

(12) United States Patent
Fong et al.

(10) Patent No.: US 9,100,964 B2
(45) Date of Patent: Aug. 4, 2015

(54) MULTI-CARRIER OPERATION FOR WIRELESS SYSTEMS

(71) Applicant: BlackBerry Limited, Waterloo (CA)

(72) Inventors: Mo-Han Fong, Sunnyvale, CA (US); Dong-Sheng Yu, Ottawa (CA); Hosein Nikopourdeilami, Stittsville (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 14/263,623

(22) Filed: Apr. 28, 2014

(65) Prior Publication Data

US 2014/0233502 A1    Aug. 21, 2014

Related U.S. Application Data

(63) Continuation of application No. 12/874,853, filed on Sep. 2, 2010, now Pat. No. 8,711,773, which is a continuation-in-part of application No. 12/806,193, filed on Sep. 2, 2009, now Pat. No. 8,761,151.

(60) Provisional application No. 61/094,644, filed on Sep. 5, 2008.

(51) Int. Cl.
*H04W 72/04* (2009.01)
*H04W 72/02* (2009.01)

(52) U.S. Cl.
CPC .......... *H04W 72/0453* (2013.01); *H04W 72/02* (2013.01)

(58) Field of Classification Search
None
See application file for complete search history.

(56) References Cited

U.S. PATENT DOCUMENTS

| 7,986,959 B2 | 7/2011 | Malladi et al. |
| 8,107,987 B2 | 1/2012 | Malladi et al. |
| 2001/0002191 A1 | 5/2001 | Kim et al. |

(Continued)

FOREIGN PATENT DOCUMENTS

| JP | 2006-166436 | 6/2006 |
| WO | 2006/116102 | 11/2006 |

(Continued)

OTHER PUBLICATIONS

Ahmad, S. et al.; "Proposed Changes/Refinements to the Sections 4-9, 13, 14 and 17 of IEEE 802.16m SDD"; IEEE 802.16 Broadband Wireless Access Working Group; Document No. IEEE C802.16m-09/1196; Jul. 3, 2009; 52 pages.

(Continued)

*Primary Examiner* — Faruk Hamza
*Assistant Examiner* — Diane Lo
(74) *Attorney, Agent, or Firm* — Fish & Richardson P.C.

(57) ABSTRACT

The present disclosure generally relates to an uplink control signal design for wireless system. One example method of a subscriber station (SS) includes performing network entry in a multi-carrier wireless environment using a primary carrier, receiving timing information corresponding to the primary carrier, receiving a first control signaling via the primary carrier, the first control signaling assigning at least one secondary carrier, transmitting uplink data via the secondary carrier using an uplink transmission timing of the secondary carrier, the uplink transmission timing of the secondary carrier being assigned the same as an uplink transmission timing of the primary carrier, and determining an adjustment of the uplink transmission timing or frequency of the secondary carrier.

22 Claims, 20 Drawing Sheets

(56) References Cited

U.S. PATENT DOCUMENTS

| | | | |
|---|---|---|---|
| 2003/0087643 A1 | 5/2003 | Mazzara | |
| 2003/0088695 A1 | 5/2003 | Kwak et al. | |
| 2006/0280142 A1 | 12/2006 | Damnjanovic et al. | |
| 2007/0091817 A1 | 4/2007 | Yoon et al. | |
| 2007/0201437 A1 | 8/2007 | Kim et al. | |
| 2008/0267165 A1 | 10/2008 | Bertrand et al. | |
| 2009/0185632 A1 | 7/2009 | Cai et al. | |
| 2009/0270103 A1* | 10/2009 | Pani et al. | 455/436 |
| 2009/0274096 A1 | 11/2009 | Fu | |
| 2009/0274120 A1 | 11/2009 | Chou | |
| 2009/0296643 A1* | 12/2009 | Cave et al. | 370/329 |
| 2009/0303951 A1 | 12/2009 | Lunttila et al. | |
| 2009/0310563 A1 | 12/2009 | Chou et al. | |
| 2010/0034163 A1 | 2/2010 | Damnjanovic et al. | |
| 2010/0035625 A1 | 2/2010 | Damnjanovic et al. | |
| 2010/0056202 A1 | 3/2010 | Li et al. | |
| 2010/0098012 A1 | 4/2010 | Bala et al. | |
| 2010/0130219 A1 | 5/2010 | Cave et al. | |
| 2010/0271970 A1 | 10/2010 | Pan et al. | |
| 2010/0316026 A1 | 12/2010 | Lee et al. | |
| 2011/0002290 A1 | 1/2011 | Kim et al. | |
| 2011/0044220 A1 | 2/2011 | Park et al. | |
| 2011/0076999 A1 | 3/2011 | Kazmi et al. | |
| 2011/0086662 A1 | 4/2011 | Fong et al. | |
| 2012/0008580 A1 | 1/2012 | Lee et al. | |

FOREIGN PATENT DOCUMENTS

| | | |
|---|---|---|
| WO | 2009/082173 | 7/2009 |
| WO | 2010/032969 | 3/2010 |
| WO | 2010/053334 | 5/2010 |

OTHER PUBLICATIONS

Cho, J. et al.; "Proposed Text of Multi-Carrier Operation for the IEEE 802.16m Amendment"; IEEE 802.16m Task Force m (TGm); Document No. IEEE C802.16m-09/0869; Apr. 27, 2009; 11 pages.

Fong, M. et al.; "Proposal for IEEE 802.16m Multi-Carrier Operation"; IEEE 802.16m Task Force (TGm); Document No. IEEE C802.16m-08/1063; Sep. 5, 2008; 10 pages.

IEEE 802.16 Task Group m (TGm); "The Draft IEEE 802.16m System Description Document"; IEEE 802.16 Broadband Wireless Access Working Group; Document No. IEEE 802.16m-08/003; Jan. 23, 2008; 19 pages.

Wang, L. et al.; "Comments on the Multi-Carrier DG Harmonized Text Proposal—MAC (1283)"; IEEE 802.16 Broadband Wireless Access Working Group; Document No. IEEE C802.16m-09/1619; Jul. 12, 2009; 15 pages.

International Search Report and Written Opinion of the International Searching Authority issued in International Application No. PCT/CA2010/001352; 13 pages.

International Preliminary Report in Patentability issued in International Application No. PCT/CA2010/001352 on Mar. 6, 2012; 9 pages.

Office Action issued in U.S. Appl. No. 12/806,193 on May 9, 2013; 23 pages.

Office Action issued in U.S. Appl. No. 12/806,193 on Aug. 19, 2013; 27 pages.

Advisory Action issued in U.S. Appl. No. 12/806,193 on Oct. 28, 2013; 5 pages.

Notice of Allowance issued in U.S. Appl. No. 12/806,193 on Mar. 26, 2014; 7 pages.

Office Action issued in U.S. Appl. No. 12/874,853 on Sep. 17, 2012; 22 pages.

Office Action issued in U.S. Appl. No. 12/874,853 on Jan. 22, 2013; 19 pages.

Office Action issued in U.S. Appl. No. 12/874,853 on May 2, 2013; 20 pages.

Office Action issued in U.S. Appl. No. 12/874,853 on Oct. 4, 2013; 26 pages.

Notice of Allowance issued in U.S. Appl. No. 12/874,853 on Dec. 16, 2013; 8 pages.

Notice of Allowance issued in U.S. Appl. No. 12/874,853 on Mar. 7, 2014; 8 pages.

Office Action issued in U.S. Appl. No. 13/620,418 on Jan. 27, 2014.

Office Action issued in U.S. Appl. No. 13/618,404 on May 10, 2013; 14 pages.

Office Action issued in U.S. Appl. No. 13/618,404 on Oct. 9, 2013; 15 pages.

Notice of Allowance issued in U.S. Appl. No. 13/618,404 on Mar. 13, 2014; 8 pages.

Notice of Allowance issued in U.S. Appl. No. 13/618,404 on Dec. 19, 2013; 14 pages.

Office Action issued in Japanese Application No. 2012-527165 on Mar. 5, 2014; 7 pages.

Office Action issued in Japanese Application No. 2012-527165 on Jun. 24, 2014; 5 pages.

Office Action issued in Chinese Application No. 201080049519.9 on Aug. 29, 2014; 6 pages, No translation.

Extended European Search Report issued in European Application No. 10813197.0 on Dec. 17, 2014; 7 pages.

Chou et al.; "Proposal for Multicarrier Uplink Control Structure"; IEEE C802.16m-08/303; May 5, 2005; 7 pages.

* cited by examiner

MULTI-CARRIER OPERATION FOR WIRELESS SYSTEMS

CROSS-REFERENCE TO RELATED APPLICATIONS

This application is a continuation of the non-provisional application Ser. No. 12/874,853, which is a continuation-in-part of the non-provisional application Ser. No. 12/806,193 resulting from conversion under 37 C.F.R. §1.53(c)(3) of U.S. provisional patent application No. 61/239,204 filed on Sep. 2, 2009, which claims the benefit of U.S. provisional patent application No. 61/094,644 filed on Sep. 5, 2008.

This application claims the benefit of U.S. provisional patent application No. 61/239,204 filed on Sep. 2, 2009, which is hereby incorporated by reference in its, entirety.

The subject matter of the present invention is related to U.S. Patent Application Ser. No. 61/035,363, filed on Mar. 10, 2008, hereby incorporated by reference herein.

The subject matter of the present invention is also related to U.S. patent application Ser. No. 10/141,013, filed on May 8, 2002 (now U.S. Pat. No. 7,492,737), hereby incorporated by reference herein.

FIELD

The application relates to wireless communication techniques in general, and more specifically to multi-carrier operations for wireless systems.

BACKGROUND

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

One possible approach for delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation).

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such that there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

The notion of using multiple carriers in a wireless system is a known concept. Multiple carriers offer the possibility of providing the end user with a rich portfolio of services, such as voice and high speed data applications. However, there is a need in the industry to develop specific operational techniques and methodologies for such wireless systems in order to improve network performance and efficiency.

SUMMARY

As embodied and broadly described herein the invention also provides a method for an SS to perform network entry in a multi-carrier wireless environment that has a plurality of primary carriers and at least one secondary carrier associated with a BS. The method comprising receiving at the SS control information sent over one of the primary carriers, processing with the SS the control information to determine if the network entry is to be performed over the one of the primary carriers or a different primary carrier of the plurality of primary carriers and performing the network entry on the basis of the determining.

As embodied and broadly described herein the invention also provides a method, in a multi-carrier wireless environment that has a primary carrier and at least one secondary carrier associated with a BS, which comprises, the BS sending over the primary carrier control information to an SS and the SS initiating in response to the control information a UL ranging with the secondary carrier.

As embodied and broadly described herein the invention also provides, in a multi-carrier wireless environment that has a primary carrier and at least one secondary carrier associated with a BS, a method for delivering system information on the secondary carrier to an SS, which comprises, the BS sending over the primary carrier control data to an SS, the control data conveying decoding information and the SS decoding a broadcast channel of the secondary carrier on the basis of the decoding information.

As embodied and broadly described herein the invention provides, in a multi-carrier wireless environment that has a plurality of primary carriers and at least one secondary carrier associated with a BS, a method for performing intra-BS handover, which includes the BS sending to the SS over a first of the plurality of the primary carriers control data and the SS switching to a second of the plurality of the primary carriers in response to the control data.

As embodied and broadly described herein the invention also provides a method for performing handover of an SS from a first BS to a second BS, wherein the first BS manages a first multicarrier wireless environment having at least one primary carrier and a secondary carrier; and the second BS manages a second multicarrier wireless environment having at least one primary carrier and a secondary carrier. The method including, the first BS sending to the SS over the primary carrier in the first environment control data, the control data conveying a multi carrier configuration information of the second wireless environment and the SS switching to the second BS for services on the basis of the control data.

As embodied and broadly described herein, the invention further provides a method for managing sleep mode of an SS in a multicarrier wireless environment that is served by a BS and has a primary carrier and a secondary carrier. The method includes, the SS monitoring successive listening windows on the primary carrier for data traffic indication, a data traffic indication in any one of the listening windows being indicative of data traffic for the SS and whether the data traffic will be delivered over the primary carrier or the secondary carrier. The SS then monitors the carrier indicated by the data traffic indication for the data traffic.

As embodied and broadly described herein the invention also provides a method for feeding back to a BS CQI in a wireless multi-carrier environment serviced by the BS, wherein the multi-carrier environment has a primary carrier and a secondary carrier. The method includes establishing communication between an SS and the BS over the primary carrier and the secondary carrier, wherein the primary carrier establishes a UL feedback control channel. The method further includes generating at the SS CQI in connection with the secondary carrier and transmitting the CQI to the BS over the UL feedback control channel.

As embodied and broadly described herein, the invention further includes a method for feeding back to a BS CQI in a wireless multi-carrier environment serviced by the BS, wherein the multi-carrier environment has a primary carrier and a secondary carrier. The method includes establishing communication between an SS and the BS over the primary carrier and the secondary carrier, wherein the secondary carrier establishes a UL feedback control channel. The method further includes generating at the SS CQI in connection with the secondary carrier and transmitting the CQI to the BS over the UL feedback control channel.

Aspects and features of the present application will become apparent to those ordinarily skilled in the art upon review of the following description of specific embodiments of a disclosure in conjunction with the accompanying drawing figures and appendices.

DESCRIPTION OF THE DRAWINGS

Embodiments of the present application will now be described, by way of example only, with reference to the accompanying drawing figures, wherein.

Like reference numerals are used in different figures to denote similar elements.

DETAILED DESCRIPTION

Figure 1:
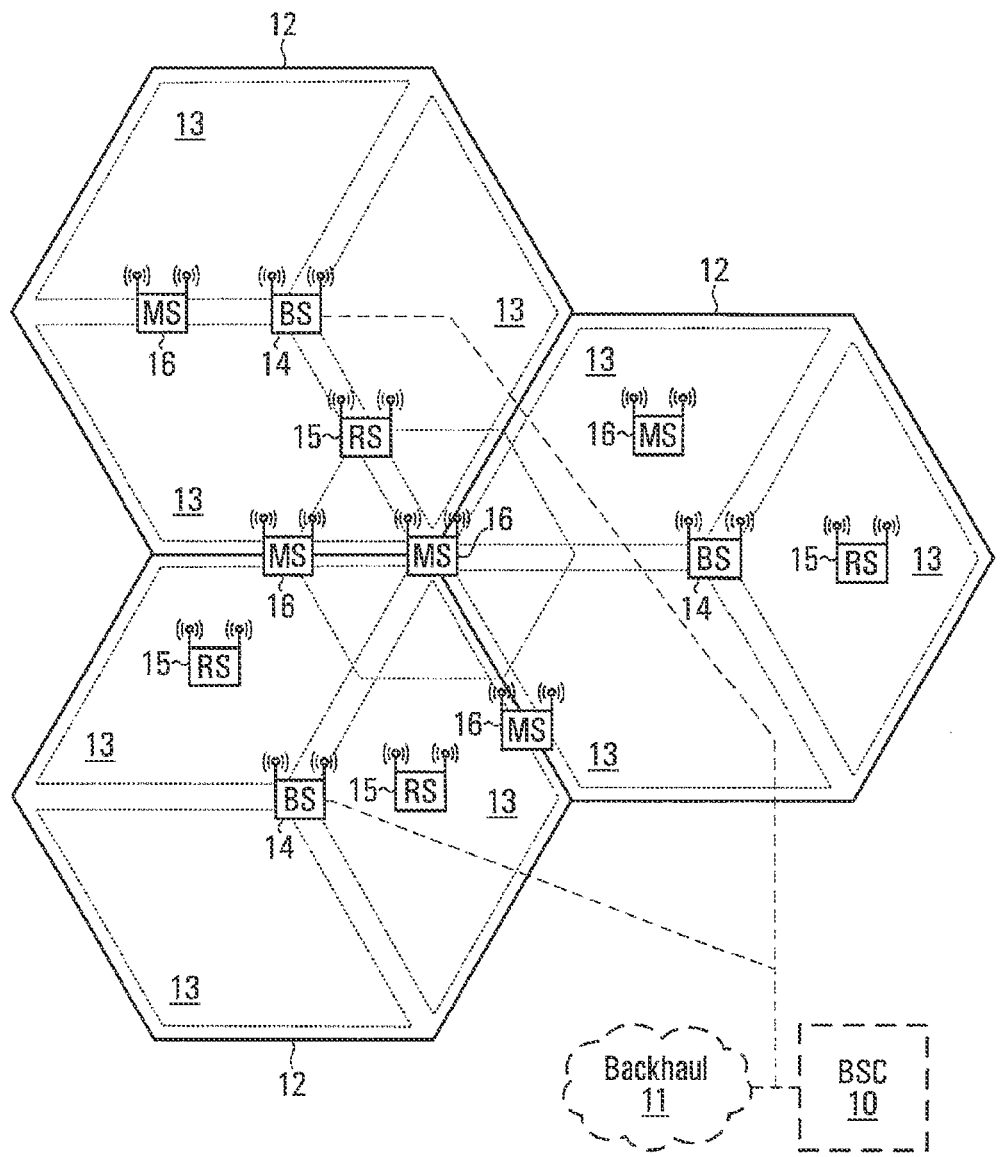
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each BS 14 facilitates communications using OFDM with subscriber stations (SS) 16 which can be any entity capable of communicating with the base station, and may include mobile and/or wireless terminals or fixed terminals, which are within the cell 12 associated with the corresponding BS 14. If SSs 16 moves in relation to the BSs 14, this movement results in significant fluctuation in channel conditions. As illustrated, the BSs 14 and SSs 16 may include multiple antennas to provide spatial diversity for communications. In some configurations, relay stations 15 may assist in communications between BSs 14 and wireless terminals 16. SS 16 can be handed off 18 from any cell 12, sector 13, zone (not shown), BS 14 or relay 15 to another cell 12, sector 13, zone (not shown), BS 14 or relay 15. In some configurations, BSs 14 communicate with each and with another network (such as a core network or the internet, both not shown) over a backhaul network 11. In some configurations, a base station controller 10 is not needed.

Figure 2:
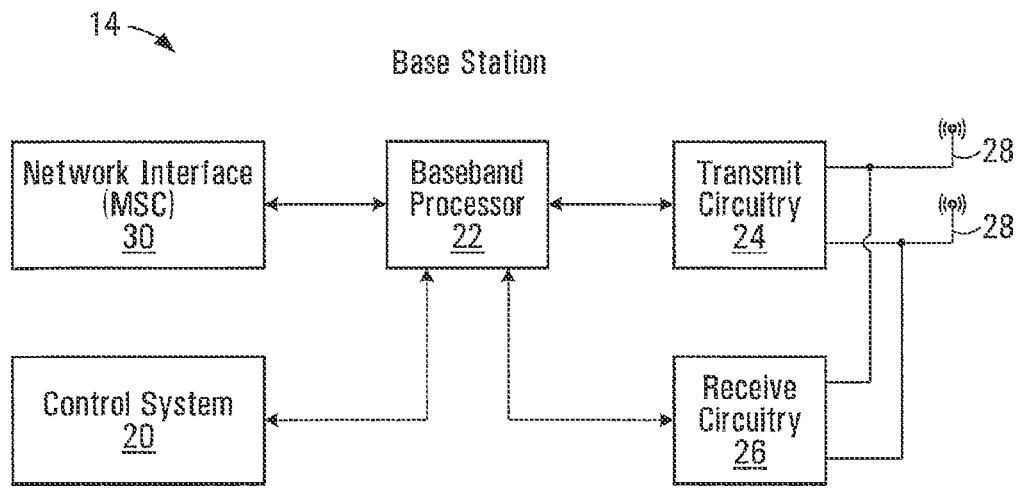
FIG. 2 is a block diagram of an example base station that might be used to implement some embodiments of the present 5 application.

With reference to FIG. 2, an example of a BS 14 is illustrated. The BS 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by SSs 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another SS 16 serviced by the BS 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
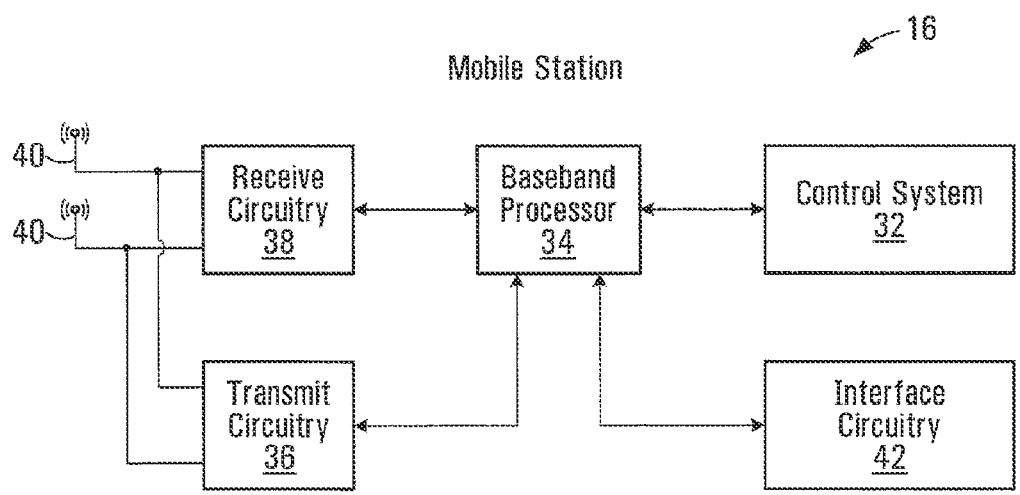
FIG. 3 is a block diagram of an example wireless terminal that might be used to implement some embodiments of the present application.

With reference to FIG. 3, an example of a subscriber station (SS) 16 is illustrated. SS 16 can be, for example a mobile station. Similarly to the BS 14, the SS 16 will include a control system 32, a baseband processor 34, transmit circuitry 36, receive circuitry 38, multiple antennas 40, and user interface circuitry 42. The receive circuitry 38 receives radio frequency signals bearing information from one or more BSs 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract is the information or data bits conveyed in the received signal. This processing typically comprises demodulation, decoding, and error correction operations. The baseband processor 34 is generally implemented in one or more digital signal processors (DSPs) and application specific integrated circuits (ASICs). For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the SS and the base station, either directly or via the relay station.

In OFDM modulation, the transmission band is divided into multiple, orthogonal subcarriers. Each subcarrier is modulated according to the digital data to be transmitted. Because OFDM divides the transmission band into multiple subcarriers, the bandwidth per carrier decreases and the modulation time per carrier increases. Since the multiple subcarriers are transmitted in parallel, the transmission rate for the digital data, or symbols (discussed later), on any given subcarrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal subcarriers are generated for multiple bands within a transmission channel. The modulated signals are digital signals having a relatively low transmission rate and capable of staying within their respective bands. The individual subcarriers are not modulated directly by the digital signals. Instead, all subcarriers are modulated at once by IFFT processing.

In operation, OFDM is preferably used for at least the downlink transmission from the BSs 14 to the SSs 16. Each BS 14 is equipped with "n" transmit antennas 28 (n>=1), and each SS 16 is equipped with "m" receive antennas 40 (m>=1). Notably, the respective antennas can be used for reception and transmission using appropriate duplexers or switches and are so labeled only for clarity.

When relay stations 15 are used, OFDM is preferably used for downlink transmission from the BSs 14 to the relays 15 and from relay stations 15 to the SSs 16.

Figure 4:
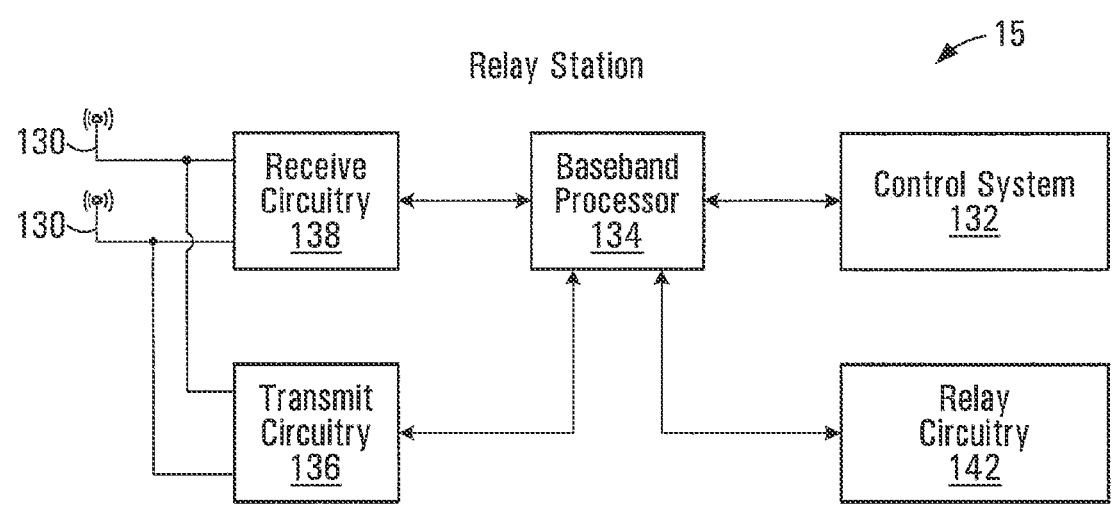
FIG. 4 is a block diagram of an example relay station that might be used to implement some embodiments of the present application.

With reference to FIG. 4, an example of a relay station 15 is illustrated. Similarly to the BS 14, and the SS 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and SSs 16. The receive circuitry 138 receives radio frequency signals bearing information from one or more BSs 14 and SSs 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the SS and the base station, either directly or indirectly via a relay station, as described above.

Figure 5:
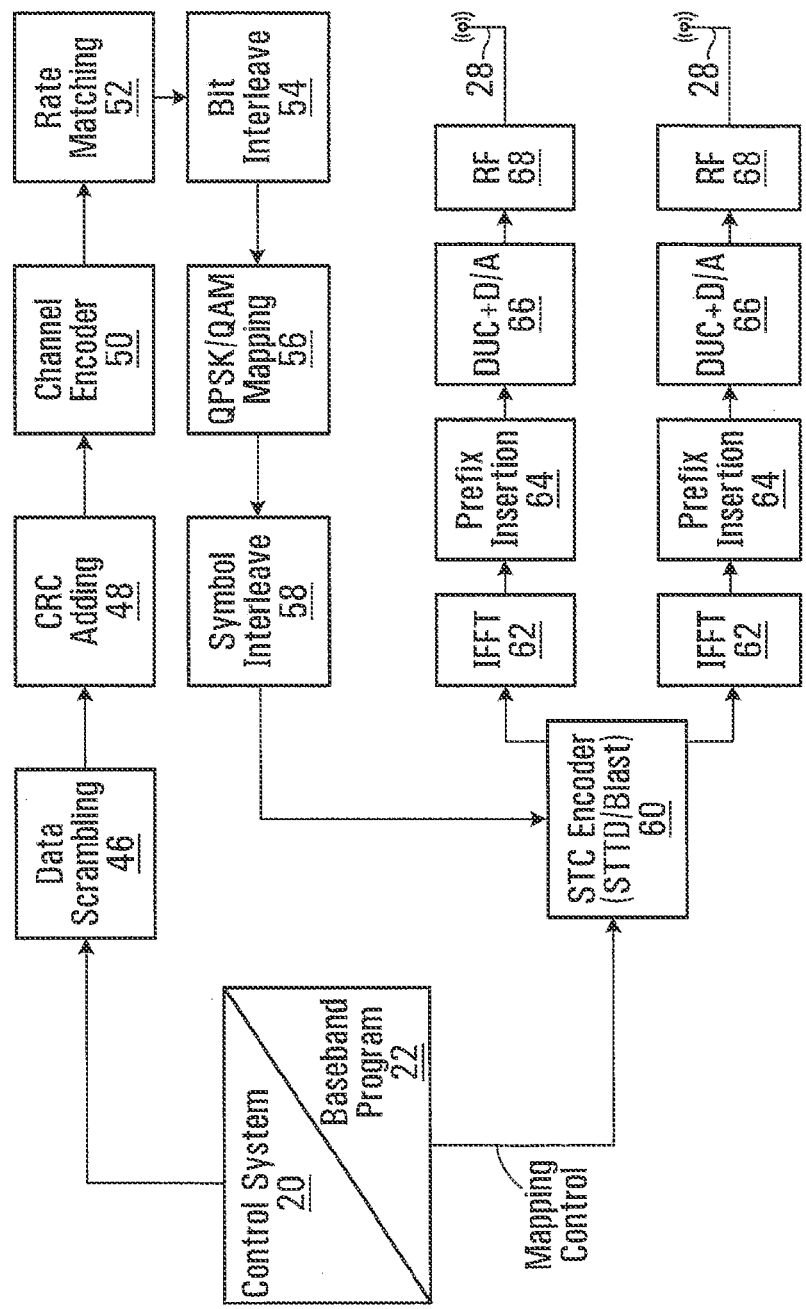
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various SSs 16 to the BS 14, either directly or with the assistance of a relay station 15. The BS 14 may use the information on the quality of channel associated with the SSs to schedule the data for transmission as well as select appropriate coding and modulation for transmitting the scheduled data. The quality of the channel is found using control signals, as described in more details below. Generally speaking, however, the quality of channel for each SS 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data may be determined and appended to the scrambled data using CRC adding logic 48. Next, channel coding is performed using channel encoder logic 50 to effectively add redundancy to the data to facilitate recovery and error correction at the SS 16. Again, the channel coding for a particular SS 16 may be based on the quality of channel. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the modulation scheme chosen by mapping logic 56. The modulation scheme may be, for example, Quadrature Amplitude Modulation (QAM), Quadrature Phase Shift Key (QPSK) or Differential Phase Shift Keying (DPSK) modulation. For transmission data, the degree of modulation may be chosen based on the quality of channel for the particular SS. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a SS 16. The STC encoder logic 60 will process the incoming symbols and provide "n" outputs corresponding to the number of transmit antennas 28 for the BS 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the SS 16.

For the present example, assume the BS 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended SS 16 are scattered among the sub-carriers. The SS 16 may use the pilot signals for channel estimation.

Figure 6:
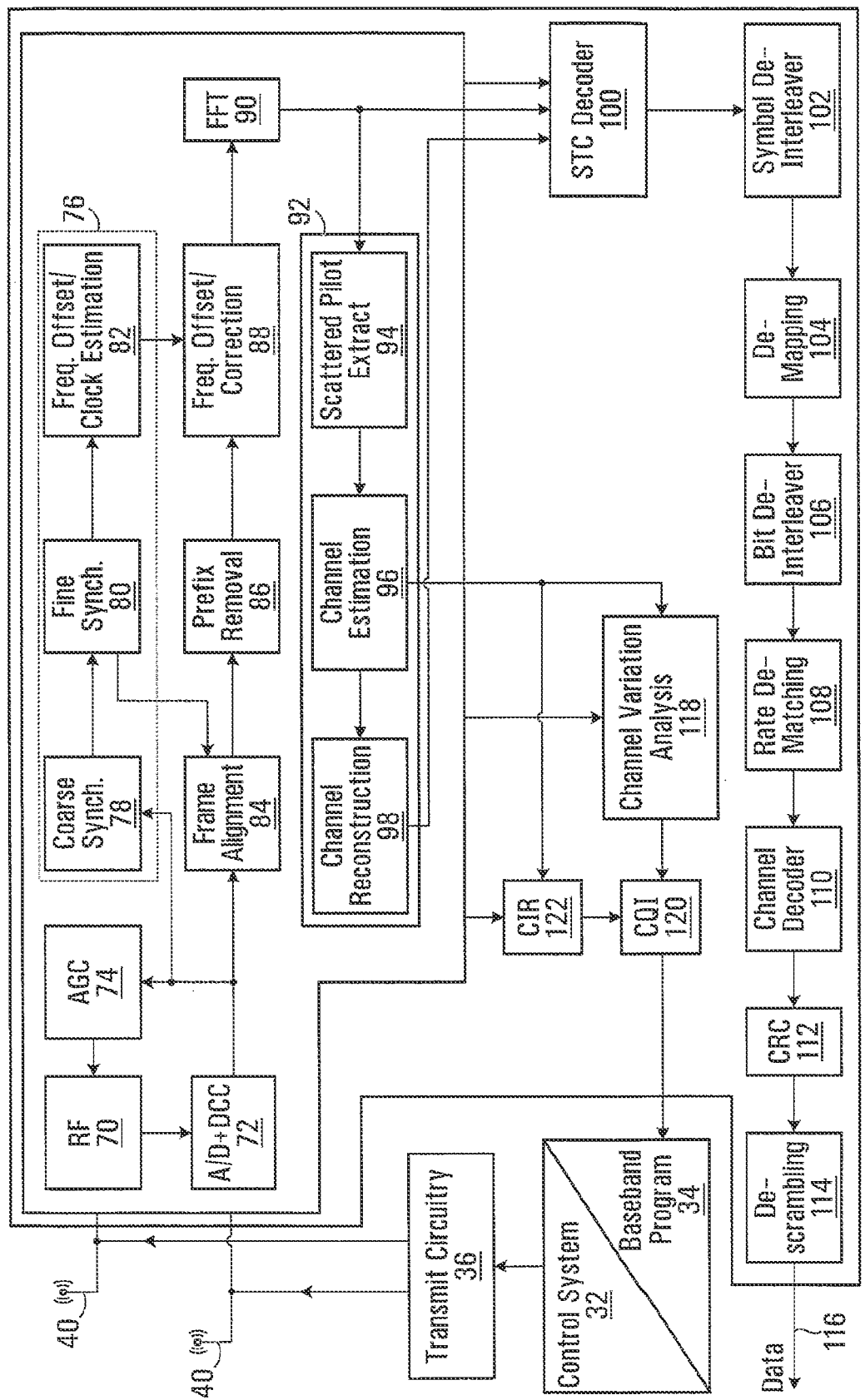
FIG. 6 is a block diagram of a logical breakdown of an example OFDM receiver architecture that might be used to implement some embodiments of the present application.

Reference is now made to FIG. 6 to illustrate reception of the transmitted signals by a SS 16, either directly from BS 14 or with the assistance of relay 15. Upon arrival of the transmitted signals at each of the antennas 40 of the SS 16, the respective signals are demodulated and amplified by corresponding RF circuitry 70. For the sake of conciseness and clarity, only one of the two receive paths is described and illustrated in detail. Analog-to-digital (ND) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level. Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bit stream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for descrambling using the known base station de-scrambling code to recover the originally transmitted data 116.

In parallel to recovering the data 116, a CQI signal comprising an indication of channel quality, or at least information sufficient to derive some knowledge of channel quality at the BS 14, is determined and transmitted to the BS 14. transmission of the CQI signal will be described in more detail below. As noted above, the CQI may be a function of the carrier-to-interference ratio (CR), as well as the degree to which the channel response varies across the various sub-carriers in the OFDM frequency band. For example, the channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data. In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

FIGS. 7-13 of the present application correspond to FIGS. 1-7 of IEEE 802.16m-08/003rl.

The description of these figures in of IEEE 802.16m-08/003rl is incorporated herein by reference.

Figure 7:
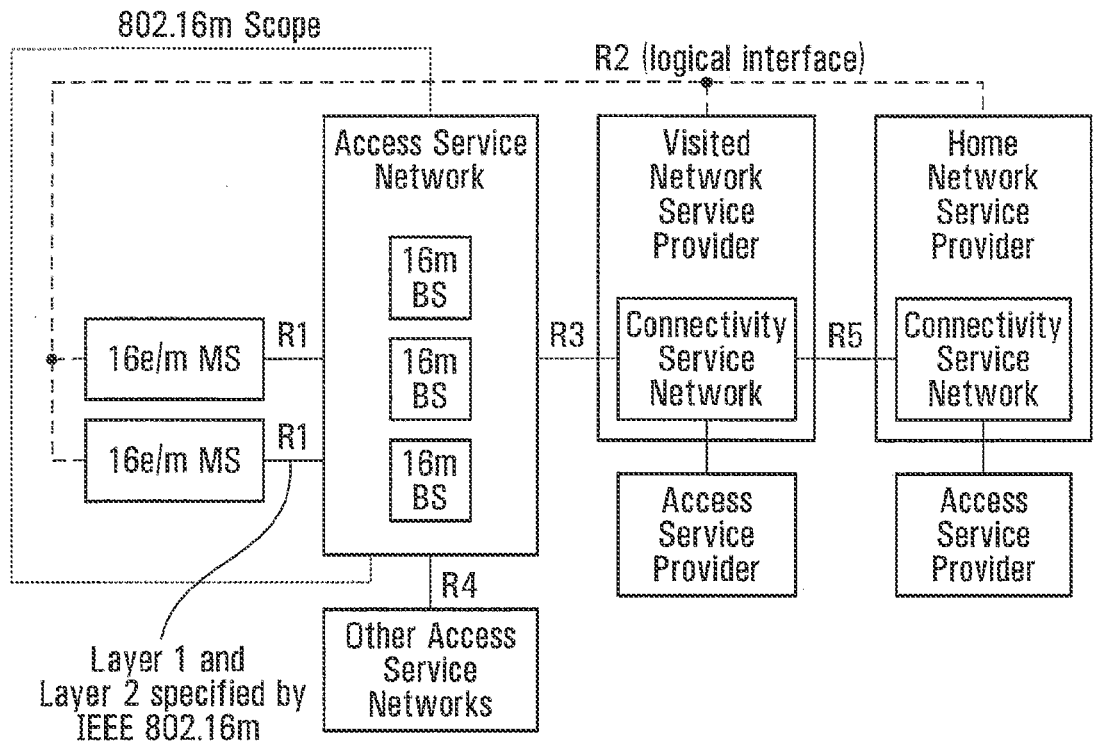
FIG. 7 is FIG. 1 of IEEE 802.16m–08/003rl, an Example of overall network architecture.

Turning now to FIG. 7, there is shown an example network reference model, which is a logical representation of a network that supports wireless communications among the aforementioned BSs 14, SSs 16 and relay stations (RSs) 15, in accordance with a non-limiting embodiment of the present invention. The network reference model identifies functional entities and reference points over which interoperability is achieved between these functional entities. Specifically, the network reference model can include an SS 16, an Access Service Network (ASN), and a Connectivity Service Network (CSN).

The ASN can be defined as a complete set of network functions needed to provide radio access to a subscriber (e.g., an IEEE 802.16e/m subscriber). The ASN can comprise network elements such as one or more BSs 14, and one or more ASN gateways. An ASN may be shared by more than one CSN. The ASN can provide the following functions:
Layer-1 and Layer-2 connectivity with the SS 16;
Transfer of AAA messages to subscriber's Home Network Service Provider (H-NSP) for authentication, authorization and session accounting for subscriber sessions
Network discovery and selection of the subscriber's preferred NSP;
Relay functionality for establishing Layer-3 (L3) connectivity with the SS 16 (e.g., IP address allocation);
Radio resource management.

In addition to the above functions, for a portable and mobile environment, an ASN can further support the following functions:
ASN anchored mobility;
CSN anchored mobility;
Paging;
ASN-CSN tunneling.

For its part, the CSN can be defined as a set of network functions that provide IP connectivity services to the subscriber. A CSN may provide the following functions:
MS IP address and endpoint parameter allocation for user sessions;
AAA proxy or server;
Policy and Admission Control based on user subscription profiles;
ASN-CSN tunneling support;
Subscriber billing and inter-operator settlement;
Inter-CSN tunneling for roaming;
Inter-ASN mobility.

The CSN can provide services such as location based services, connectivity for peer-to-peer services, provisioning, authorization and/or connectivity to IP multimedia services. The CSN may further comprise network elements such as routers, AAA proxy/servers, user databases, and interworking gateway MSs. In the context of IEEE 802.16m, the CSN may be deployed as part of a IEEE 802.16m NSP or as part of an incumbent IEEE 802.16e NSP.

Figure 8:
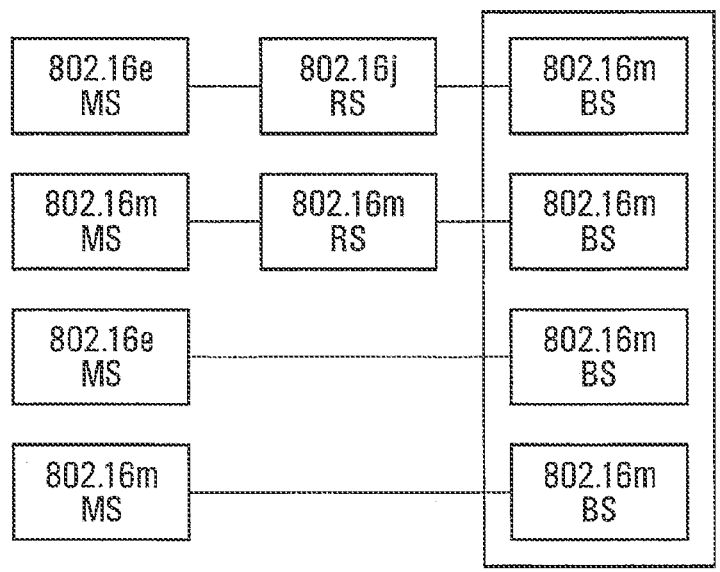
FIG. 8 is FIG. 2 of IEEE 802.16m-08/003rl, a Relay Station in overall network architecture.

In addition, RSs 15 may be deployed to provide improved coverage and/or capacity. With reference to FIG. 8, a BS 14 that is capable of supporting a legacy RS communicates with the legacy RS in the "legacy zone". The BS 14 is not required to provide legacy protocol support in the "16m zone". The relay protocol design could be based on the design of IEEE 802-16j, although it may be different from IEEE 802-16j protocols used in the "legacy zone".

Figure 9:
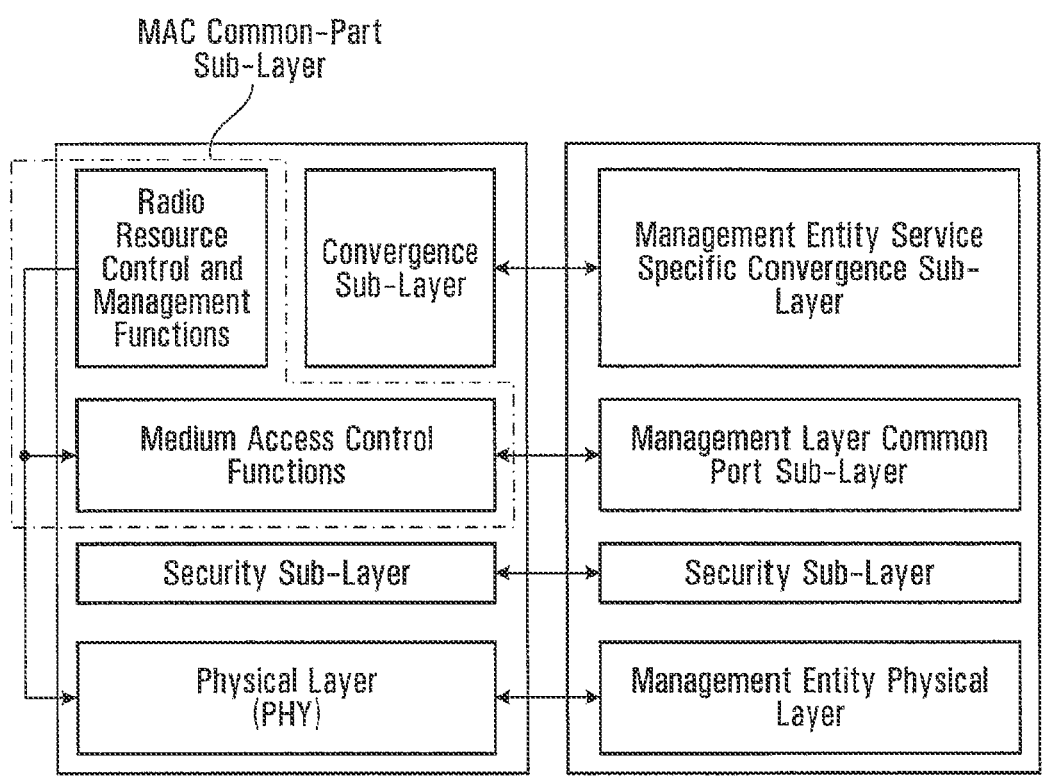
FIG. 9 is FIG. 3 of IEEE 802.16m-08/003rl, a System Reference Model.

With reference now to FIG. 9, there is shown a system reference model, which applies to both the SS 16 and the BS 14 and includes various functional blocks including a Medium Access Control (MAC) common part sublayer, a convergence sublayer, a security sublayer and a physical (PHY) layer.

The convergence sublayer performs mapping of external network data received through the CS SAP into MAC SDUs received by the MAC CPS through the MAC SAP, classification of external network SDUs and associating them to MAC SFID and CID, Payload header suppression/compression (PHS).

The security sublayer performs authentication and secure key exchange and Encryption.

The physical layer performs Physical layer protocol and functions.

The MAC common part sublayer is now described in greater detail. Firstly, it will be appreciated that Medium Access Control (MAC) is connection-oriented. That is to say, for the purposes of mapping to services on the SS 16 and associating varying levels of QoS, data communications are carried out in the context of "connections". In particular, "service flows" may be provisioned when the SS 16 is installed in the system. Shortly after registration of the SS 16, connections are associated with these service flows (one connection per service flow) to provide a reference against which to request bandwidth. Additionally, new connections may be established when a customer's service needs change. A connection defines both the mapping between peer convergence processes that utilize the MAC and a service flow. The service flow defines the QoS parameters for the MAC protocol data units (PDUs) that are exchanged on the connection. Thus, service flows are integral to the bandwidth allocation process. Specifically, the SS 16 requests uplink bandwidth on a per connection basis (implicitly identifying the service flow). Bandwidth can be granted by the BS to a MS as an aggregate of grants in response to per connection requests from the MS.

Figure 10:
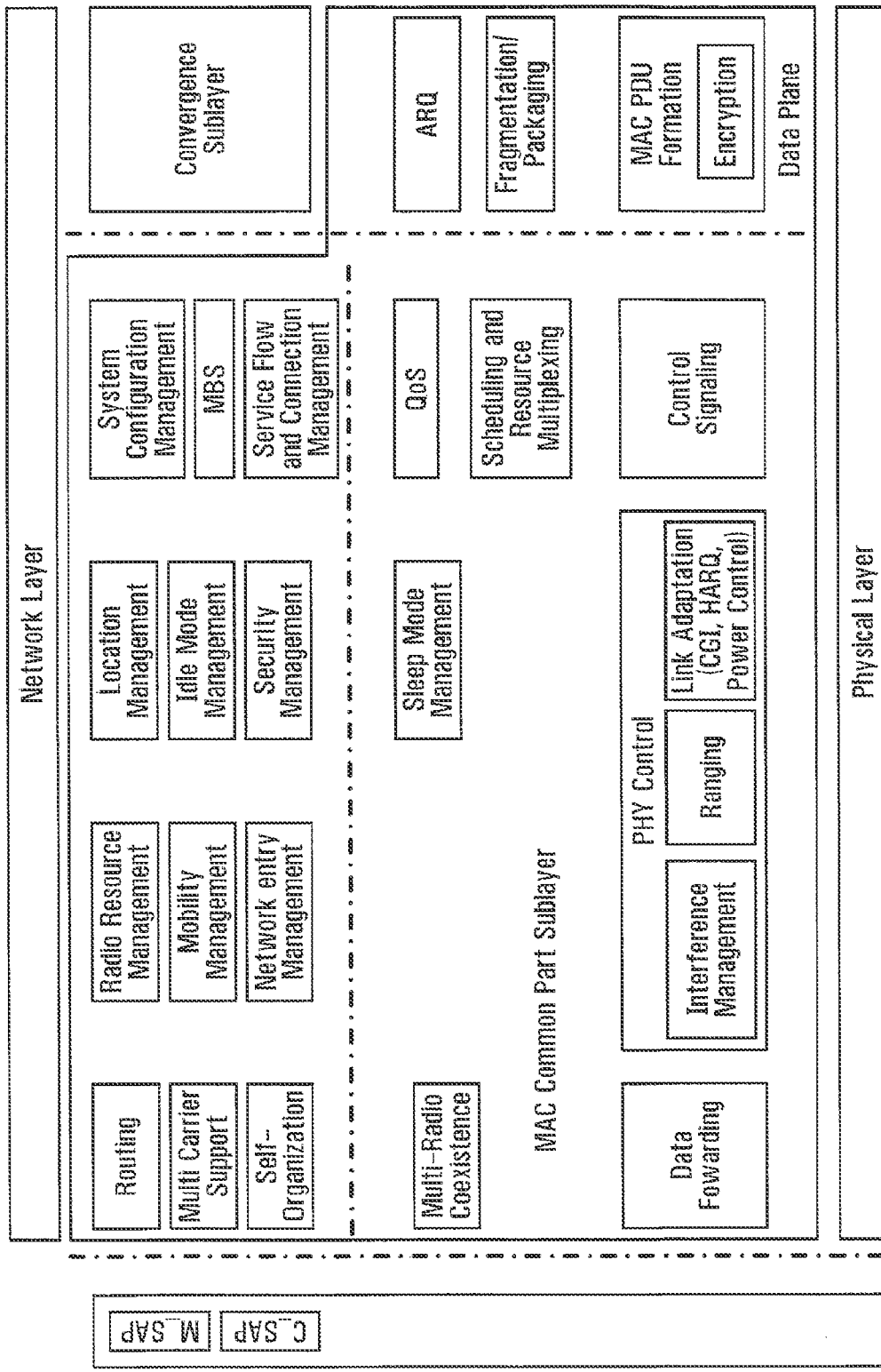
FIG. 10 is FIG. 4 of IEEE 802.16m-08/003rl, The IEEE 802.16m Protocol Structure.

With additional reference to FIG. 10, the MAC common part sublayer (CPS) is classified into radio resource control and management (RRCM) functions and medium access control (MAC) functions.

The RRCM functions include several functional blocks that are related with radio resource functions such as:
  Radio Resource Management
  Mobility Management
  Network Entry Management
  Location Management
  Idle Mode Management
  Security Management
  System Configuration Management
  MBS (Multicast and Broadcasting Service)
  Service Flow and Connection Management
  Relay functions
  Self Organization
  Multi-Carrier Radio Resource Management The Radio Resource Management block adjusts radio network parameters based on traffic load, and also includes function of load control (load balancing), admission control and interference control.

Mobility Management

The Mobility Management block supports functions related to Intra-RAT/Inter-RAT handover. The Mobility Management block handles the Intra-RAT/Inter-RAT Network topology acquisition which includes the advertisement and measurement, manages candidate neighbor target BSs/RSs and also decides whether the MS performs Intra-RAT/Inter-RAT handover operation.

Network Entry Management

The Network Entry Management block is in charge of initialization and access procedures. The Network Entry Management block may generate management messages which are needed during access procedures, i.e., ranging, basic capability negotiation, registration, and so on.

Location Management

The Location Management block is in charge of supporting location based service (LBS). The Location Management block may generate messages including the LBS information.

Idle Mode Management

The Idle Mode Management block manages location update operation during idle mode. The Idle Mode Management block controls idle mode operation, and generates the paging advertisement message based on paging message from paging controller in the core network side.

Security Management

The Security Management block is in charge of authentication/authorization and key management for secure communication.

System Configuration Management

The System Configuration Management block manages system configuration parameters, and system parameters and system configuration information for transmission to the MS.

MBS (Multicast and Broadcasting Service)

The MBS (Multicast Broadcast Service) block controls management messages and data associated with broadcasting and/or multicasting service.

Service Flow and Connection Management

The Service Flow and Connection Management block allocates "MS identifiers" (or station identifiers—STIDs) and "flow identifiers" (FIDs) during access/handover/service flow creation procedures. The MS identifiers and FIDs will be discussed further below.

Relay Functions

The Relay Functions block includes functions to support multi-hop relay mechanisms. The functions include procedures to maintain relay paths between BS and an access RS.

Self Organization

The Self Organization block performs functions to support self configuration and self optimization mechanisms. The functions include procedures to request RSs/MSs to report measurements for self configuration and self optimization and receive the measurements from the RSs/MSs.

Multi-Carrier Support

The Multi-carrier (MC) support block enables a common MAC entity to control a PHY spanning over multiple frequency channels. The channels may be of different bandwidths (e.g. 5, 10 and 20 MHz), be on contiguous or non-contiguous frequency bands. The channels may be of the same or different duplexing modes, e.g. FDD, TDD, or a mix of bidirectional and broadcast only carriers. For contiguous frequency channels, the overlapped guard sub-carriers are aligned in frequency domain in order to be used for data transmission.

The medium access control (MAC) includes function blocks which are related to the physical layer and link controls such as:
  PHY Control
  Control Signaling
  Sleep Mode Management
  QoS
  Scheduling and Resource Multiplexing
  ARQ
  Fragmentation/Packing
  MAC PDU formation
  Multi-Radio Coexistence
  Data forwarding
  Interference Management
  Inter-BS coordination PHY Control The PHY Control block handles PHY signaling such as ranging, measurement/feedback (CQI), and HARQ ACK/

NACK. Based on CQI and HARQ ACK/NACK, the PHY Control block estimates channel quality as seen by the MS, and performs link adaptation via adjusting modulation and coding scheme (MCS), and/or power level. In the ranging procedure, PHY control block does uplink synchronization with power adjustment, frequency offset and timing offset estimation.

Control Signaling

The Control Signaling block generates resource allocation messages.

Sleep Mode Management

Sleep Mode Management block handles sleep mode operation. The Sleep Mode Management block may also generate MAC signaling related to sleep operation, and may communicate with Scheduling and Resource Multiplexing block in order to operate properly according to sleep period.

QoS

The QoS block handles QoS management based on QoS parameters input from the Service Flow and Connection Management block for each connection.

Scheduling and Resource Multiplexing

The Scheduling and Resource Multiplexing block schedules and multiplexes packets based on properties of connections. In order to reflect properties of connections Scheduling and Resource Multiplexing block receives QoS information from The QoS block for each connection.

ARQ

The ARQ block handles MAC ARQ function. For ARQ-enabled connections, ARQ block logically splits MAC SDU to ARQ blocks, and numbers each logical ARQ block. ARQ block may also generate ARQ management messages such as feedback message (ACK/NACK information).

Fragmentation/Packing

The Fragmentation/Packing block performs fragmenting or packing MSDUs based on scheduling results from Scheduling and Resource Multiplexing block.

MAC PDU Formation

The MAC PDU formation block constructs MAC PDU so that BS/MS can transmit user traffic or management messages into PHY channel. MAC PDU formation block adds MAC header and may add sub-headers.

Multi-Radio Coexistence

The Multi-Radio Coexistence block performs functions to support concurrent operations of IEEE 802.16m and non-IEEE 802.16m radios collocated on the same mobile station.

Data Forwarding

The Data Forwarding block performs forwarding functions when RSs are present on the path between BS and MS. The Data Forwarding block may cooperate with other blocks such as Scheduling and Resource Multiplexing block and MAC PDU formation block.

Interference Management

The Interference Management block performs functions to manage the inter-cell/sector interference. The operations may include:
  MAC layer operation
  Interference measurement/assessment report sent via MAC signaling
  Interference mitigation by scheduling and flexible frequency reuse
  PHY layer operation
  Transmit power control
  Interference randomization
  Interference cancellation
  Interference measurement
  Tx beamforming/precoding Inter-BS Coordination The Inter-BS coordination performs functions to coordinate the actions of multiple BSs by exchanging information, e.g., interference management. The functions include procedures to exchange information for e.g., interference management between the BSs by backbone signaling and by MS MAC messaging. The information may include interference characteristics, e.g. interference measurement results, etc.

Figure 11:
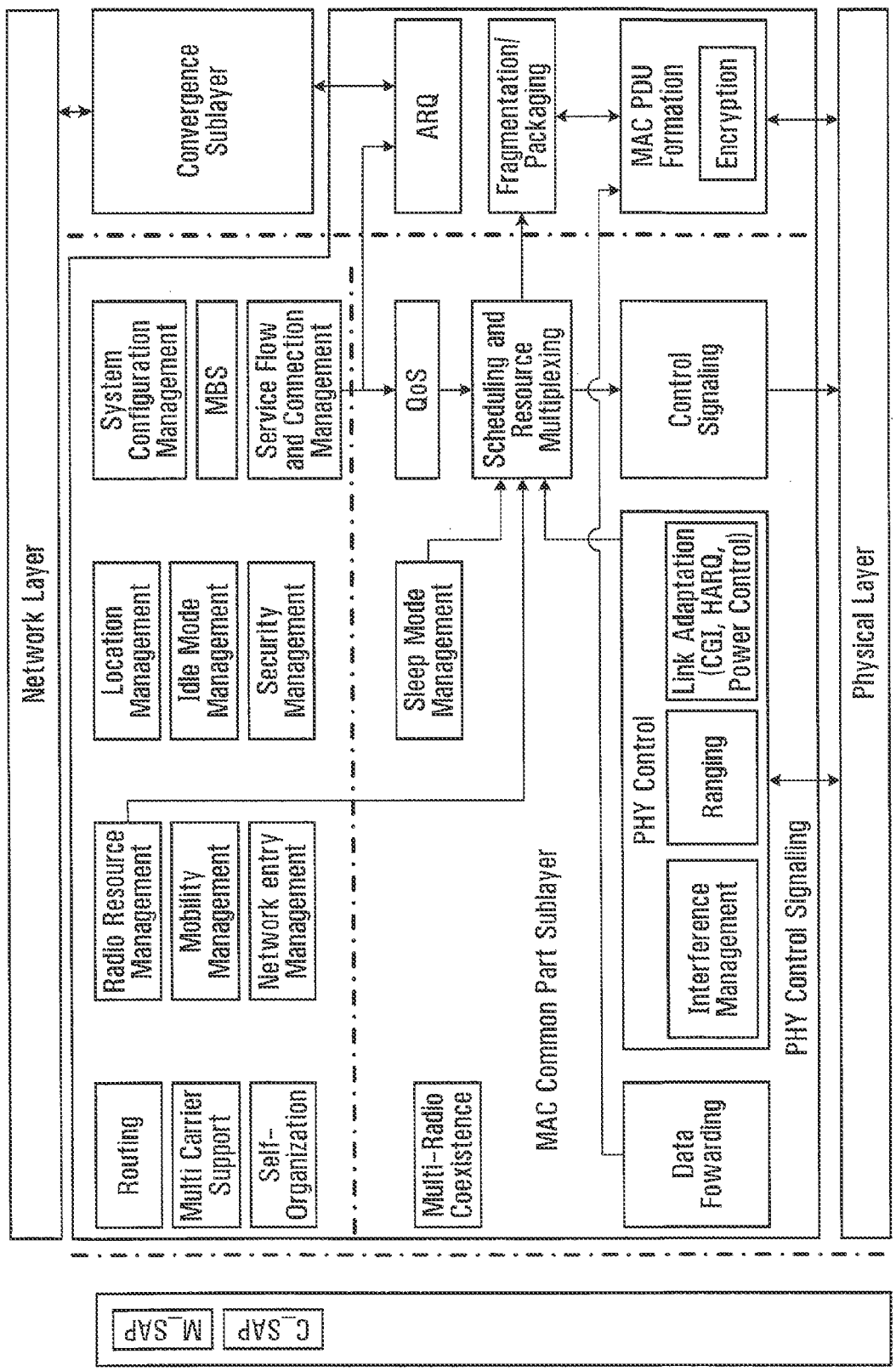
FIG. 11 is FIG. 5 of IEEE 802.16m-08/003rl, The IEEE 802.16m MS/BS Data Plane Processing Flow.

Reference is now made to FIG. 11, which shows the user traffic data flow and processing at the BS 14 and the SS 16. The dashed arrows show the user traffic data flow from the network layer to the physical layer and vice versa. On the transmit side, a network layer packet is processed by the convergence sublayer, the ARQ function (if present), the fragmentation/packing function and the MAC PDU formation function, to form MAC PDU(s) to be sent to the physical layer. On the receive side, a physical layer SDU is processed by MAC PDU formation function, the fragmentation/packing function, the ARQ function (if present) and the convergence sublayer function, to form the network layer packets. The solid arrows show the control primitives among the CPS functions and between the CPS and PHY that are related to the processing of user traffic data.

Figure 12:
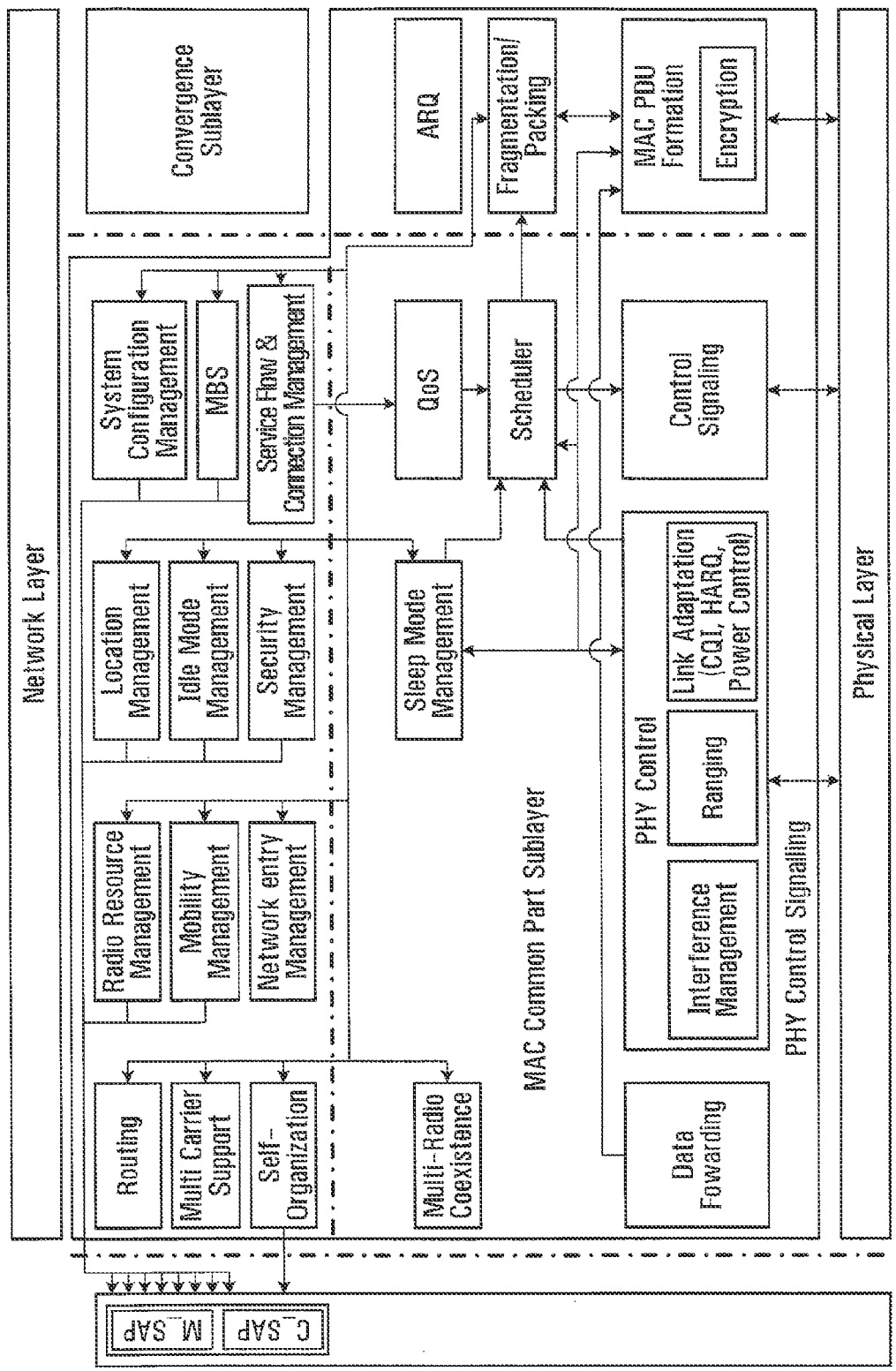
FIG. 12 is FIG. 6 of IEEE 802.16m-08/003rl, The IEEE 802.16m MS/BS Control Plane Processing Flow.

Reference is now made to FIG. 12, which shows the CPS control plane signaling flow and processing at the BS 16 and the MS 14. On the transmit side, the dashed arrows show the flow of control plane signaling from the control plane functions to the data plane functions and the processing of the control plane signaling by the data plane functions to form the corresponding MAC signaling (e.g. MAC management messages, MAC header/sub-header) to be transmitted over the air. On the receive side, the dashed arrows show the processing of the received over-the-air MAC signaling by the data plane functions and the reception of the corresponding control plane signaling by the control plane functions. The solid arrows show the control primitives among the CPS functions and between the CPS and PHY that are related to the processing of control plane signaling. The solid arrows between M_SAP/C_SAP and MAC functional blocks show the control and management primitives to/from Network Control and Management System (NCMS). The primitives to/from M_SAP/C_SAP define the network involved functionalities such as inter-BS interference management, inter/intra RAT mobility management, etc, and management related functionalities such as location management, system configuration etc.

Figure 13:
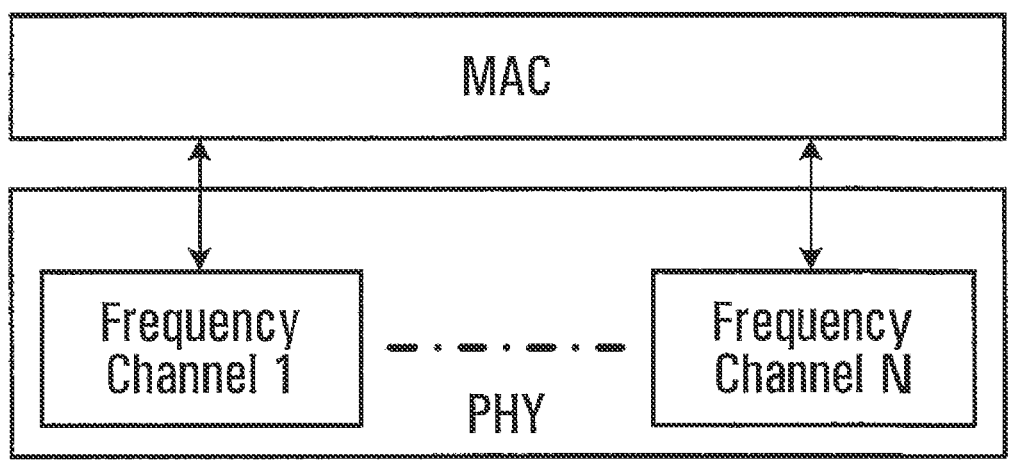
FIG. 13 is FIG. 7 of IEEE 802.16m-08/003rl, Generic protocol architecture to support multicarrier system.

Reference is now made to FIG. 13, which shows a generic protocol architecture to support a multicarrier system. A common MAC entity may control a PHY spanning over multiple frequency channels. Some MAC messages sent on one carrier may also apply to other carriers. The channels may be of different bandwidths (e.g. 5, 10 and 20 MHz), be on contiguous or non-contiguous frequency bands. The channels may be of different duplexing modes, e.g. FDD, TDD, or a mix of bidirectional and broadcast only carriers.

The common MAC entity may support simultaneous presence of MSs 16 with different capabilities, such as operation over one channel at a time only or aggregation across contiguous or non-contiguous channels.

Control signals, like other data, are transmitted over the wireless medium between the BS 14 and an SS 16 using a particular modulation scheme according to which the data is converted into symbols. A symbol is the smallest quantum of information that is transmitted at once. A symbol may represent any number of bits, depending on the modulation scheme used, but commonly represents between 1 and 64 bits, and in some common modulation scheme, each symbol represents 2 bits. Regardless of the modulation scheme used, a single modulated symbol is sent over a single subcarrier and generally represents the smallest quantum of information that can be sent over the air interface.

A wireless communication system of the type described earlier can be designed to operate as a multi carrier system. A multi carrier system divides the spectrum in several carriers that provide different functions. Two types of carriers can be defined, namely:

1. Primary carrier; this is the carrier that typically carries the synchronization channel (or preamble), all the system information, neighbor BS information, paging information and resource to allocation/control information. Examples of control information include:
   a. Essential static system wide PHY information for decoding of DL PHY frames/sub-frames, such as bandwidth configurations, CP sizes, multi carrier configuration, system time, TDD ratio and guard tones among others;
   b. Essential pseudo-dynamic sector-side PHY information for decoding of DL PPHY frames/sub-frames. Examples include channelization (partitioning of diversity zone, localized zone, pilot structure, etc), legacy/16m resource partition, sub-frame control configuration etc. Can also contain initial ranging region/codes information for SS to do fast initial access procedure;
   c. Non-PHY system information such as BSID, operator ID and subnet ID among others;
   d. PHY/MAC system configuration information such as handover parameters, power control parameters, fast feedback region and ranging region, among others;
   e. Neighbor BS information (c and d information about a neighboring BS);
   f. Paging information such as quick paging and regular paging information;
   g. Dynamic DL and UL resource allocation and control information related to traffic burst assignment, such as burst assignment related information (MCS, MIMO mode resource location, user ID, ACK/NAK of UL traffic and UL power control among others).
2. Secondary carrier; this is a carrier that carries a subset of the system information (such as information of type b above) relating to superframe configuration on that carrier, as well as resource allocation/control information of each sub-frame within the carrier (such as information of the type g above). The secondary carrier can also is convey the synchronization channel (or preamble).

Generally, one or multiple carriers within the spectrum can be designated as primary carriers. Similarly, one or multiple carriers within the spectrum can be designated as secondary carriers. An SS interacts with the carriers differently depending on its capability. A narrowband SS, in other words an SS that has bandwidth capability to transmit/receive on only one carrier at a time is assigned to a primary carrier. However, a wideband SS, in other words an SS that has bandwidth capability to transmit/receive on multiple carriers at a time, is assigned to one or more primary carriers and can also interact with one or more secondary carriers.

In a specific example of implementation, the primary carrier is code division multiplexed using a Walsh code. Pilot, paging and sync channel as defined in CDMA 2000 are transmitted on the primary carrier. These channels will have the same configuration as 1XRTT overhead channels for backward compatibility reasons. The primary carrier can be overlaid to the existing IS95, IS95A&B and 1XRTT carriers. The primary carrier is used to provide voice and other real-time services to users. The primary carrier can also be used to transmit MAC information to the SS.

The secondary carrier(s) are used to provide various types of data services to the users on the forward link. The secondary carriers can be time division multiplexed or code division multiplexed. The assignment of the time slot or code space on the secondary carriers is transmitted by the MAC channels on the primary carriers.

When an SS that can be a mobile or fixed station performs network entry, it does so with a primary carrier of a BS. At this end, the SS will try to determine when it enters the BS coverage region which carrier is a primary carrier and which carrier is a secondary carrier. To allow an SS to distinguish between a primary carrier and a secondary carrier the SS is provided with logic that will identify certain characteristics of the carriers to enable the SS to make the distinction. Several possibilities exist in this regard:

1. The secondary carriers are devoid of preamble or sync channel. In this fashion, an SS will not be able to perform synchronization with a secondary carrier. Since only the primary carriers have a preamble or sync channel, the SS will be able to perform synchronization with a primary carrier and perform the network entry procedure via the primary carrier.
2. The secondary carrier has a preamble or sync channel. However, one of the broadcast channels, such as the primary broadcast channel is not present. When the SS performs synchronization with the secondary carrier it will search for the broadcast channels that are deemed to exist and if one or more are missing then the SS will determine that this is a secondary carrier. On the other hand if all the expected broadcast channels are identified, the SS determines that it has performed synchronization with a primary carrier and can proceed with network entry.
3. The secondary carrier contains a preamble/sync channel and all the expected broadcast channels, such as both the primary and the secondary broadcast channel. In this instance either one or both of the primary and secondary broadcast channels carry control information to indicate whether the carrier is primary or secondary. In this example, the SS will perform synchronization with the secondary carrier and will read the control information in the primary/secondary broadcast channel. If the information states that the carrier is a secondary carrier then the MS will not attempt a network entry; rather it will continue searching for a primary carrier.
4. The secondary carrier contains a preamble or sync channel that is encoded with information to indicate to the SS that the carrier is a secondary carrier. An example of such encoding is to provide a unique preamble sequence allowing the SS to distinguish between a primary carrier and a secondary carrier.

Figure 14:
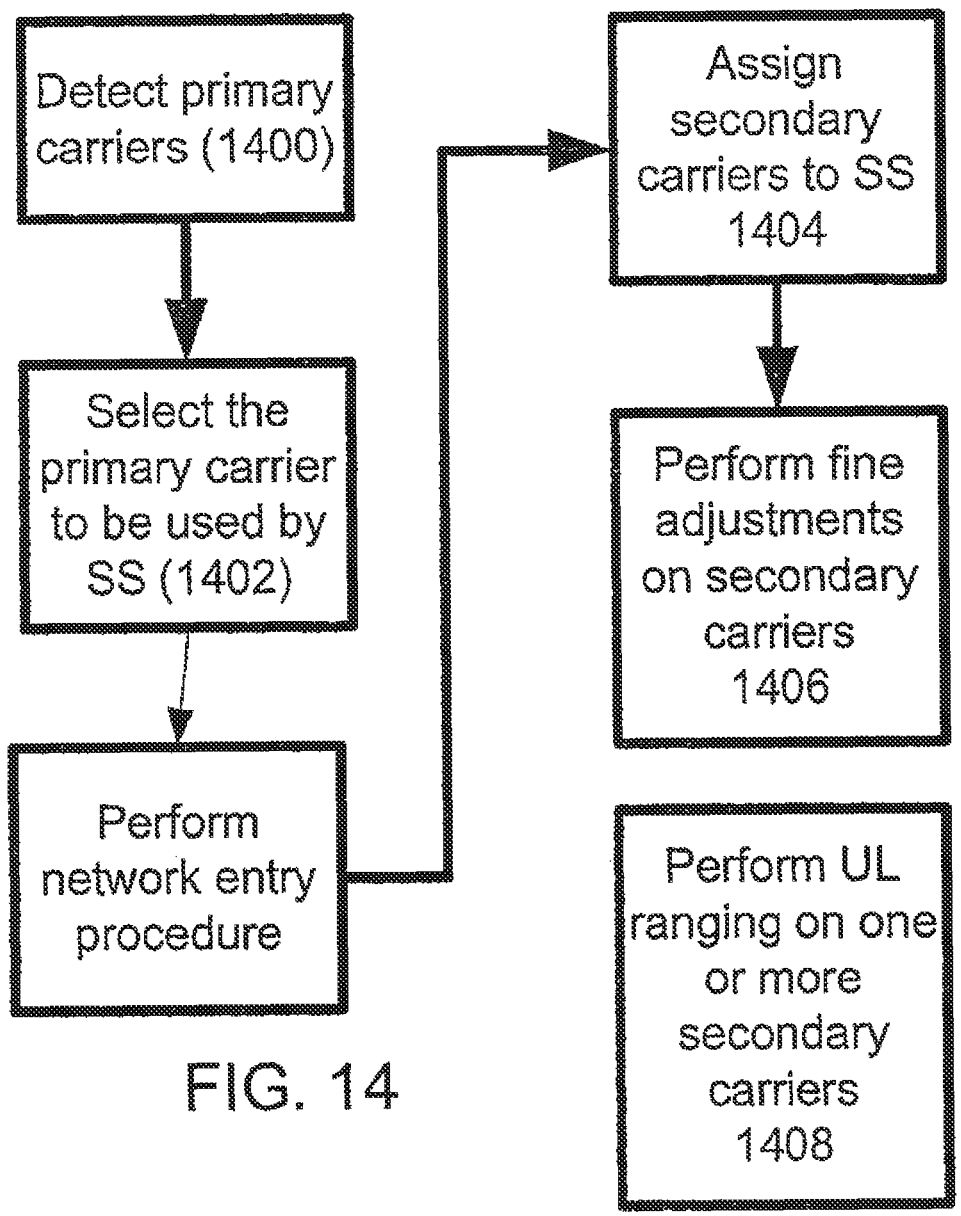
FIG. 14 is a high level block diagram of a process for distinguishing between primary and secondary carriers when an SS is performing network entry operation.

FIG. 14 illustrates generally the process that is implemented by an SS/BS to perform a network entry procedure.

At the first step 1400, the SS performs a "scan" of the spectrum to identify a primary carrier associated with the BS. In doing so, the SS may first find a secondary carrier but that carrier is discarded by using any one of the options discussed earlier. As soon as a primary carrier is identified the SS will scan the broadcast channel of the primary carrier in order to extract control information that helps the SS determining which primary carrier should be used for network entry procedure. This is illustrated at step 1402. Since several primary carriers are available, some of those may be better suited than others. For example, one of the primary carriers may be more loaded than another one and, for load balancing reasons it makes more sense for the SS to perform the network entry procedure on the primary carrier that has the lighter load.

Examples of control information that can be carried in the broadcast channel of the primary carrier include information on the loading condition of the carrier, and service or QoS offered on the carrier, among others. The SS includes logic implemented in software that executes on the CPU of the SS that determines on the basis of this control information if the network entry procedure should be performed on this primary carrier or on another primary carrier. The logic can work in different ways and use different criteria for making the selection. One option is to compare the control information with certain target values (of QoS for example) that represent the lowest quality connection acceptable. If the target values are not met, the SS will discard this primary carrier and will continue searching for a more suitable primary carrier.

Another possibility is to broadcast over the primary carrier control information about all the other primary carriers associated with the BS, such that the SS can compare them and determine which one is best for network entry and subsequent communication service.

Figure 15:
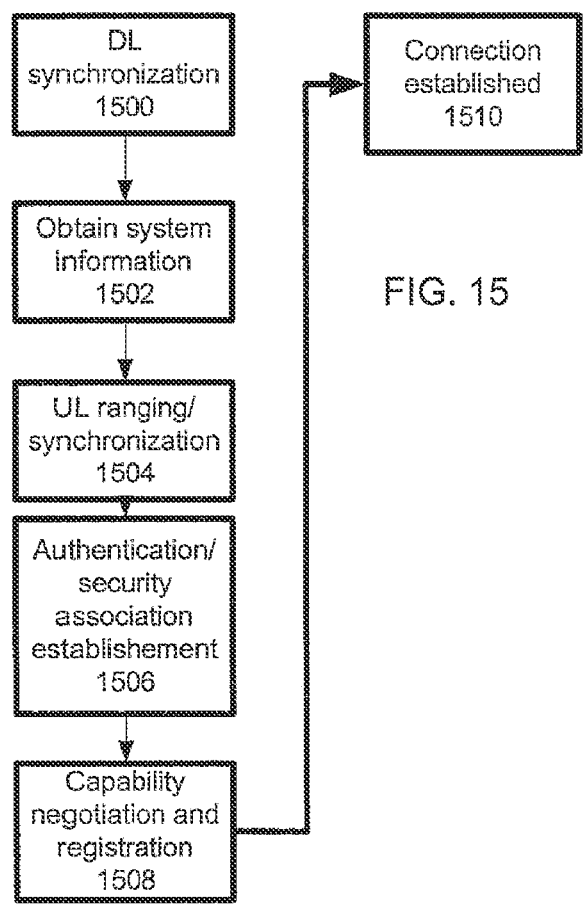
FIG. 15 is a more detailed block diagram illustrating steps for performing a network entry operation in a wireless multi carrier system.

Once a suitable primary carrier has been identified, the SS performs network entry procedure. The network entry procedure is illustrated in greater detail by the flowchart at FIG. 15. Note that some of the steps may be performed in part or in full during the identification of the primary carrier to use.

The network entry procedure starts with DL synchronization step 1500 during which the SS will determine the proper synchronization code to use such that it can receive data. At step 1502, the SS will extract system information that is transmitted by the BS. One specific example of system information that can be transmitted is the assignment of specific secondary carriers, as it will be discussed in greater detail later. UL ranging/synchronization is performed at step 1504. This requires the SS to send one or more ranging request packets that are processed by the BS to identify the timing of the request. The BS responds with a ranging response packet giving time and power adjustment informations, among others to the SS.

Authentication and security association are established at step 1506. This process involves the data exchange allowing the BS to validate the SS and as well as setting up a secure communication link. At step 1508 the SS sends information to the BS about its respective capabilities such that the BS is aware as to the type of services/communication protocols and features that can be made available to the SS. The network entry terminates at step 1510 where the connection with the network is now established.

Referring back to FIG. 14, in particular to step 1404 where the BS assigns one or more of the secondary carriers to the SS. The assignment is done by sending to the SS control information over the primary carrier that identifies the one or more secondary carriers to be used. In one specific example, the SS will use the same timing, frequency and power adjustments for the secondary carrier as those for the primary carrier. In this case, the SS will not be required to perform UL ranging for time, frequency synchronization and power adjustment purposes on the secondary carrier. Note however, that the SS may be provided with logic to fine tune the timing/frequency synchronization/power settings on the secondary carrier. This fine tuning operation is illustrated at step 1406. The purpose is to slightly adjust those parameters to improve the data communication parameters of the link. The fine tuning operation is done in two steps. During the first step, the MS will perform measurement on the preamble and/or pilot of the secondary carrier. During the second step, those measurements are processed to derive correction parameters that are implemented. Further measurements can then be made to further fine tune the timing/frequency synchronization/power. The process can be iteratively repeated as many times as desired.

Note that the assignment of the secondary carriers can be done statically or dynamically. A static assignment is an assignment where the secondary carriers are assigned once and that assignment does not change over time. A dynamic assignment process re-evaluates periodically the secondary carriers to determine of a change is required. A dynamic assignment process would be initiated by the BS which sends control information to the SS to notify the SS of a change of secondary carriers. In essence the process described at step 1404 is repeated, including the fine adjustment on the secondary carriers.

Yet another possibility to consider is for the BS to send control information to force the SS to perform UL ranging with one or more secondary carriers. This is shown at step 1408. The UL ranging process is triggered by the SS in response to control information sent by the BS over the primary carrier. The UL ranging on one or more of the secondary carriers can be done at intervals on the basis of pre-determined schedule. Alternatively the UL ranging can be performed only when the secondary carriers are being assigned to the SS.

Note that the assignment process of the secondary carriers is dependent on the capabilities of the SS. For a multi-radio SS or wide band SS where the SS can simultaneously decode multiple carriers, the SS can decode the broadcast channels of secondary carriers or other primary carriers. In this instance, the BS sends control information on the primary carrier which indicates to the SS to decode the broadcast channels of a specific set of secondary carriers.

For a single radio SS or non-contiguous spectrum, where the SS cannot simultaneously decode multiple carriers, the BS also conveys the system information about the secondary carriers to use, over the primary carrier. The SS can then decode the broadcast channel of the secondary carrier(s), but can operate on one carrier at a time (primary or secondary).

Figure 16:
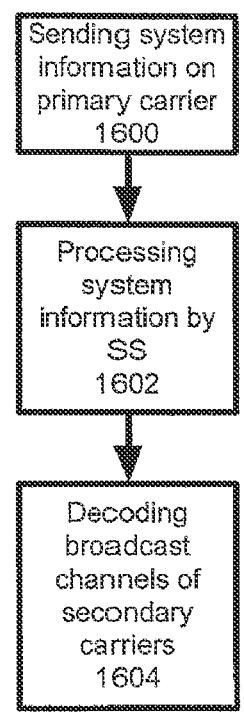
FIG. 16 is a block diagram illustrating a method for obtaining system information on secondary carriers in a wireless multi carrier operation.

This process is illustrated at FIG. 16. At step 1600, after the BS has determined which secondary carriers to assign to a certain SS, the BS will generate control information which is sent to the SS over the primary carrier. The control information is processed by the SS at step 1602. At step, 1604 the SS will start decoding the specific broadcast channels of secondary carriers indicated by the control information received.

Figure 17:
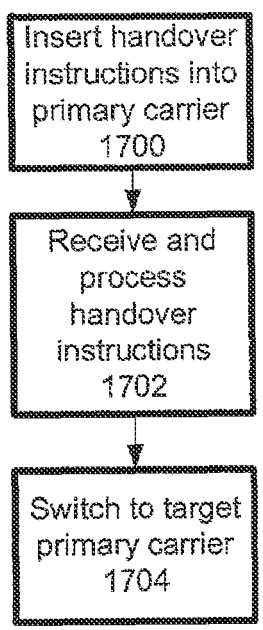
FIG. 17 is a block diagram of a process for performing handover in a wireless multi carrier system.

Handover operations in the context of wireless multi carrier systems are performed by taking into account both the primary carrier and the secondary carriers. In the case of an intra-BS handover, where the SS will switch from one primary carrier to another primary carrier associated with the same BS, the process, as illustrated at FIG. 17 starts by inserting control information in the primary carrier which will trigger the handover process. This is shown at step 1700. Intra-BS handover can be done for the purpose of load balancing for example. The BS monitors the loading on each primary carrier and if one of the primary carriers is near load capacity the BS instructs one or more of the SSs associated with that primary carrier to switch over to another primary carrier. To effect the switch, the BS will insert into the primary carrier control information that will indicate which other primary carrier to switch to as well as timing information specifying the exact moment the switch should be made.

As illustrated at step 1702, the SS will receive the control information and process it. At the exact action time, the SS will start decoding the broadcast channel of the target primary carrier to make the switch effective, as shown at step 1704.

During the intra-BS handover, the SS may retain the original secondary carrier assignment or may change it. A change may be done if there is some operational benefit to associate the SS with a new set of secondary carriers, such as better QoS, the original secondary carriers are overloaded, etc. If a change of secondary carriers is not required the switch from one primary carrier to another primary carrier does not affect the secondary carriers associated with the SS. On the other hand, if a change of secondary carriers is desirable, two options are possible. One option is to send control information over the original primary carrier which indicates in addition to the target primary carrier new secondary carriers to use by the SS. The control information also specifies the time at which the SS should start decoding the broadcast channels of the new secondary carriers. In this fashion, at the exact action time the SS starts decoding the broadcast channel of the target primary carrier and the broadcast channels of the secondary carriers.

Another possibility is to effect the secondary carrier switch in two steps, first by switching the primary carrier and once the SS starts receiving control information over the target primary carrier, then perform the secondary carrier switch. More specifically, control information is sent over the newly acquired primary carrier which indicates which are the secondary carriers to use. Note that a switch of secondary carriers may include a switch of all the secondary carriers (when the SS is associated with a plurality of secondary carriers) or a change of only one secondary carrier while another secondary carrier remains unchanged.

In the case of an inter-BS handover the entire set of carriers, namely the primary carrier and the secondary carriers are switched to a new primary carrier and a secondary carrier of the new BS. To facilitate this process, the currently serving BS broadcasts/multicasts/uncasts the neighboring BS multi-carrier configuration information to the SS. The SS will process the information, store it and when the handover is initiated use the information to connect with the primary and secondary carriers of the new BS.

Figure 18:
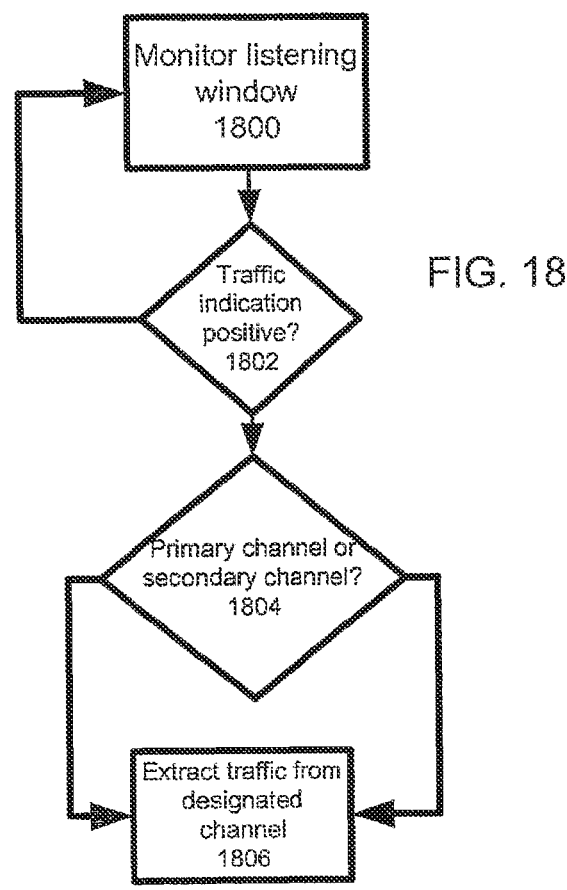
FIG. 18 is a block diagram of a process for performing sleep mode management in a wireless multi carrier system.

The sleep mode operation management in a multi carrier environment is illustrated at FIG. 18. When the SS is in a sleep mode it follows a set of predetermined sleep mode parameters, which define a sleep window during which the SS is not listening and a listening window in which the SS is listening for traffic indication. As shown at step 1800, the BS would notify the SS that it has traffic scheduled for it by placing a positive traffic indication in a listening window. The listening window is implemented over the primary carrier. The SS monitors the listening window and goes to sleep during the sleep window.

At decision step 1802, the logic processing the contents of the listening window determines if it contains a positive traffic indication for the SS. In the negative, the process returns to step 1800 to monitor the contents of the next listening window.

If a positive traffic indication is identified, the SS processes the data to determine over which carrier the data traffic is expected to occur. This is shown at step 1804. The data traffic indication may indicate that the data traffic will occur over the primary carrier or over a secondary carrier. The mobile will then monitor the designated carrier to extract the data traffic. This is shown at step 1806.

The idle mode operation is the same for a single carrier and a multi carrier environment. The BS derives for the SS idle mode parameters that include a paging listening window configuration and a paging unavailable window configuration. During the paging listening window, the SS monitors the paging indication and message on the primary carrier. When paged, the SS performs a network re-entry procedure on the primary carrier.

Figure 19:
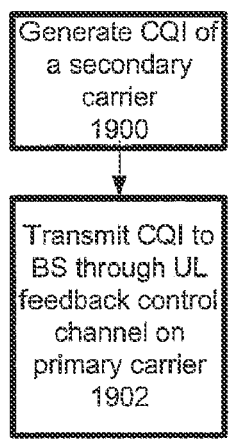
FIG. 19 is a block diagram of a process for providing to a BS feedback on channel quality, according to a first example of implementation of the invention.
Figure 20:
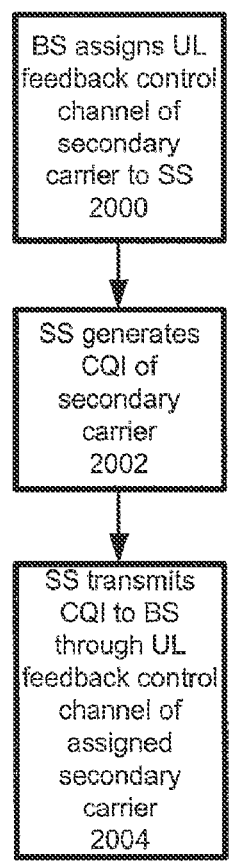
FIG. 20 is a block diagram of a process for providing to a BS feedback on channel quality, according to a second example of implementation of the invention.
Figure 21:
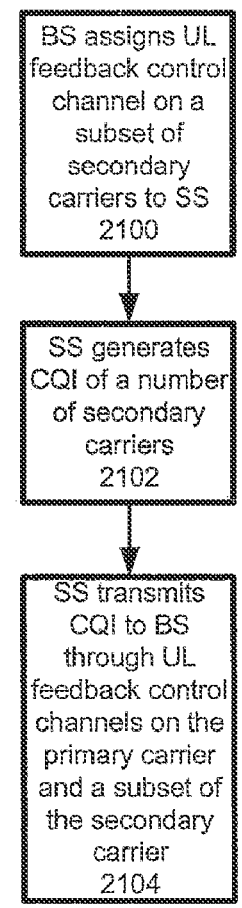
FIG. 21 is a block diagram of a process for providing to a BS feedback on channel quality, according to a third example of implementation of the to invention.
Figure 22A:
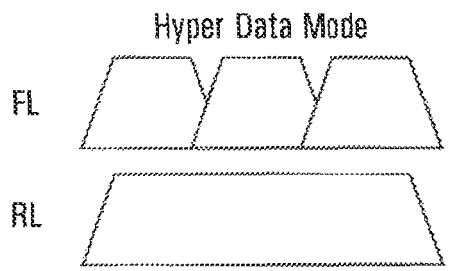
FIGS. 22(a)-22(d) are examples of different carrier assignment.
Figure 22B:
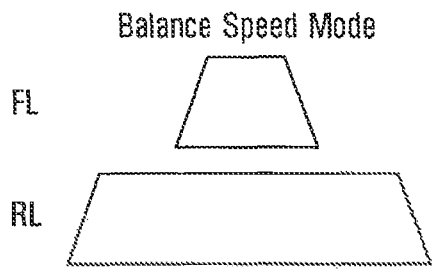
Figure 22C:
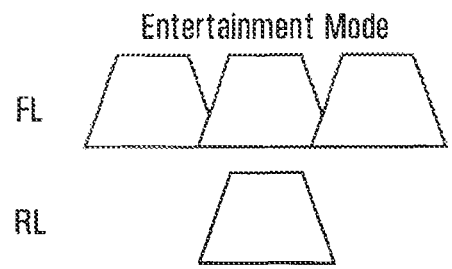
Figure 22D:
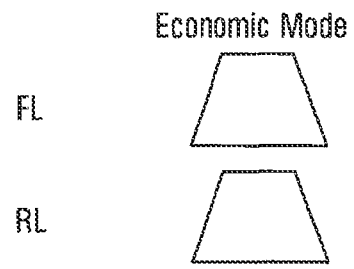

FIGS. 19, 20 and 21 illustrate different examples of a channel quality feedback procedure in a multi carrier environment. FIG. 19 illustrates a first example in which the SS reports Channel Quality Information (CQI) of a secondary carrier. In this case, the secondary carrier is not assigned a UL feedback control channel so the CQI is reported over a carrier other than the one which is being monitored. The SS determines the CQI in connection with the secondary carrier of interest, as shown at step 1900 and transmits the CQI through the UL feedback control channel over the primary carrier. This is illustrated at step 1902. The CQI transmission includes an identification of the secondary carrier for which the reporting is being done such that the BS can adequately identify the carrier upon receipt of the CQI information.

FIG. 20 illustrates another example of implementation. In this example the BS assigns at step 2000 a UL feedback control channel to the secondary carrier associated with the SS. At step 2002 the SS determines the CQI associated with that secondary carrier and transmits it to the BS over the UL feedback control channel, as shown at step 2004. Note that when several secondary carriers are assigned to the SS, the same process can be replicated in connection with each secondary carrier, namely each secondary carrier is assigned a UL feedback control channel and the CQI of each secondary carrier is forwarded to the BS over the respective UL feedback control channel.

FIG. 21 illustrates yet another example of channel quality feedback. In this instance the BS assigns a UL feedback control channel in connection with a subset of secondary carriers. In other words, one UL feedback control channels is assigned the task of carrying CQI relating to several secondary carriers. This is shown at step 2100. At step 2102 the SS will generate CQI values for each of the secondary carriers on which feedback is to be provided. The set of CQI values is packaged and sent over the BS through the assigned UL feedback control channel, as shown in step 2104. The packaging involves associating with each CQI value a tag or any other identifier that would allow the BS to associate the particular CQI value with the proper secondary carrier.

The UL feedback control channel can be implemented on the primary carrier m or on the secondary carrier. Alternatively more than one UL feedback control channel can be provided.

Multi-Carrier Operation

The present disclosure describes multicarrier operation for network entry, system information acquisition, handover, sleep mode, idle mode, channel quality feedback.

Network Entry Operation

In some implementations, a mobile station (MS) performs network entry with a primary carrier of a BS. A MS needs to know which carrier(s) of the BS are primary carriers. There are 4 possible options that allow the MS to detect which carrier(s) are primary carriers. Option 1: secondary carrier may have no preamble or sync channel. In such a case, the MS may not be able to perform synchronization with a secondary carrier and therefore may not proceed with network entry procedure with a secondary carrier. Option 2: secondary carrier contains preamble or sync channel. However, one of the broadcast channel (e.g. the primary broadcast channel) is not present. When MS does not detect the primary broadcast channel, the MS knows that this is a secondary carrier and may not proceed with network entry procedure with that carrier. Option 3: secondary carrier contains preamble/sync channel, and all broadcast channels (e.g. both primary broadcast channel and secondary broadcast channel). The primary broadcast channel or secondary broadcast channel contains control information that indicates whether the carrier is a primary or secondary carrier. Option 4: secondary carrier contains preamble or sync channel. Different preamble sequence is used to indicate if the carrier is a primary carrier or secondary carrier.

To facilitate the MS to select which primary carrier to perform network entry procedure, the broadcast channel transmitted on a primary carrier can carry information that helps the MS make the selection. Such information includes loading condition on the carrier, service or QoS offered on the carrier etc. MS enters the network through primary carrier. BS either semi-statically or dynamically assigns secondary carrier(s) via control signaling through primary carrier. MS may omit UL ranging (for time/frequency synchronization and power adjustment purpose) with secondary carrier. In this case, MS uses the same timing, frequency and power adjustment information for the secondary carrier as in the primary carrier. The MS may perform fine timing/frequency/power adjustment on the secondary carrier through measuring the preamble and/or pilot on the secondary carrier. BS may instruct the MS, through control signaling on the primary carrier, to perform UL ranging with one or more secondary carriers.

In both single carrier and multi-carrier operation, the MS network entry procedure can be simplified to the following:

DL synchronization
Obtain system information
UL ranging/synchronization
Authentication/security association establishment
Capability negotiation and registration
Connection establishment
Obtaining System Information of Secondary Carriers In some implementations, for a multi-radio MS or wideband MS where the MS can simultaneously decode multiple carriers, the MS can decode the broadcast channels of secondary carriers or other primary carriers. BS may instruct the MS, through control signaling on the primary carrier, to decode broadcast channels of specific set of secondary carriers.

For single radio MS or non-contiguous spectrum, where the MS cannot simultaneously decode multiple carriers, the BS can convey the system information of secondary carriers to MS, through control signaling on the primary carrier.

Handover Operation

In an intra-BS handover, the BS may instruct the MS, through control signaling on the current primary carrier, to switch/handover to another primary carrier within the same BS for load balancing purpose or other reasons. In such a case, the MS just switches to the target primary carrier at action time specified by the BS. There is no need for handover re-entry procedure (i.e. ranging, network re-entry).

In an inter-BS handover, to facilitate MS' scanning of neighbor BS' primary carriers, the current serving BS may broadcast/multicast/unicast the neighbor BS' multi-carrier configuration information to the MS.

Sleep Mode Operation

One set of unified sleep mode parameters (i.e., sleep window and listening window configuration) are configured for a MS regardless of single carrier or multi-carrier operation. During listening window, MS monitors the traffic indication on the primary carrier. If traffic indication is negative, MS goes back to sleep. If traffic indication is positive, MS continues to monitor the primary carrier control channel to know if it has traffic scheduled for transmission on the primary carrier and/or secondary carrier.

Idle Mode Operation

One set of unified idle mode parameters (i.e., paging listening window and paging unavailable window configuration) are configured for a MS regardless of single carrier or multi-carrier operation. During paging listening window, MS monitors the paging indication and message on the primary carrier. When paged, the MS perform network re-entry procedure with the primary carrier.

Channel Quality Feedback

Option 1: MS transmit the channel quality information (CQI) of a secondary carrier through the UL feedback control channel on the primary carrier. Option 2: MS is assigned UL feedback control channel on a secondary carrier. MS transmits the CQI of the secondary carrier through the assigned UL feedback control channel on that carrier. Option 3: MS is assigned UL feedback control channel on a subset of secondary carriers. MS transmits the CQI of a number of secondary carriers (as instructed by the BS) through the assigned UL feedback control channels on the primary carrier and a subset of the secondary carriers.

High Level Structure of MC-DV (Multi-Carrier—Data and Voice)

Carrier Structures

On the forward link, N×1.25 MHz carriers (N>=3) can be configured for the MC-DV system. The chip rate of each carrier is operated at 1.2288 Mbps. The configurations of these carriers are defined as follows: One or more primary carrier is defined in a MC-DV system. The primary carrier is code division multiplexed using Walsh code. Pilot, paging and sync channel as defined in cdma2000 are transmitted on the primary carrier. These channels will have the same configuration as 1XRTT overhead channels for backward compatibility reasons. The primary carrier can be overlaid to the existing 1S95, 1S95A&B and 1XRTT carriers. The primary carrier is used to provide voice and other real-time services to the users. The primary carrier can also be used to transmit medium access control (MAC) information to the mobile station.

The supplemental carrier(s) are used to provide various types of data services to the users on the forward link. The supplemental carriers can be time division multiplexed or code division multiplexed. The assignment of the time slot or code space on the supplemental carriers are transmitted by the MAC channels on the primary carriers.

Channel and Frequency Assignment 1 to N carriers can be assigned to one or a group of users to transmit and receive data on forward and reverse link. FIGS. 22(a) to 22(d) are examples of different configurations. Please note that this invention does not preclude other forward and reverse carrier assignment configurations. For example, when only one carrier is used, this carrier does not need to be always in the center of the 3-carrier group.

The following describes the forward link operations. When connected, the base station directs each mobile station to perform the C/I estimation of M (M<=N) carriers periodically. Upon receiving the feedback, the base station schedules target mobile station, the carrier assignment and the transmission data rate for each time slot or code space based on the channel condition and the type of services of the targeted user, as well as the loading condition on different carriers. Mobile station detects the assignment from the MAC channel and receives the transmission slots accordingly.

Adaptive Modulation and Coding Across Different Carriers for Forward Link

The base station schedules the transmitted frequency carriers, the payload size, the modulation and the coding schemes of each burst to users according to the channel estimation from each mobile stations and the type of services of each user.

Different modulation and coding scheme for different carriers can be assigned to each user. For instance, the user may be assigned on only one carrier for the data burst. This happens probably because there is a big difference between the channel conditions on different carriers, thus the base station selects to transmit to the target user only on the carrier with the best channel condition to improve the overall system throughput. The user may also be assigned on more than one carriers for the data burst. This happens probably because the channel conditions among different carriers are relatively same. Thus the base station will transmit on multiple carriers to benefit from frequency diversity. In addition, the loading condition of different carriers may also influence base station's decision of carrier assignment.

When transmitted on different carriers simultaneously to the same user for the same packet, a generic coding and punctuation scheme is employed. The packet will be coded by Turbo code with a base coding rate. Then coded bits will be divided into sub-code blocks. The number of sub-code blocks corresponds to number of carriers assigned. The block size of different sub-codes may not be the same due to the possibility of different modulation schemes on different carriers.

Retransmission on Different Carriers for Forward Link

MC-DV uses physical layer HARQ to improve the performance. Upon receiving each packet, the mobile station transmits ACK/NAK feedback to the base station. The base station then transmits the redundancy bits to the mobile station. The base station selects the designated carriers, the coding and modulation schemes of the retransmission packets according to mobile station's feedback on channel estimations at the time of retransmission. The sequence number in the MAC channel assignment informs the mobile station that it is a redundancy transmission.

Service-Driven Protocol Design

Overall Protocol Structure

Figure 23:
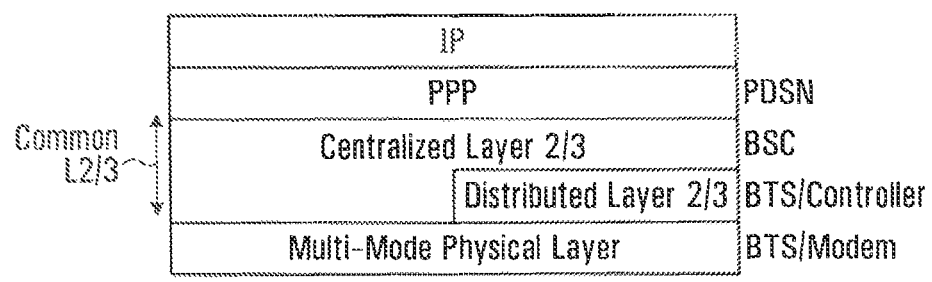
FIG. 23 is an example protocol structure for high speed multi-carrier wireless network.

As described in previous sections, the physical layer resource assignment to each mobile station is performed according to the radio channel condition experienced in the forward link of the mobile station; as well as service requirements which are defined by upper protocol layers, i.e. air-interface protocol layer 2 and 3. The physical resource can be divided into two domains: frequency domain in terms of carrier(s); and time domain in terms of time slot(s). We propose a versatile service-driven protocol design consists of a common layer 2 and layer 3 protocol stack as shown in FIG. 23, to support multiple, inhomogeneous carriers and physical layer configurations. The layer 2 and 3 protocols provide a common interface with the wireline upper layer protocols such as PPP/IP/TCP. The layer 2 and 3 protocols interface with the multi-mode physical layer by selecting the appropriate physical layer resource in both frequency domain and time domain to meet the quality of service required by upper layers applications as well as the subscriber's profile. One possible implementation of the protocol layers is shown in FIG. 23, where centralized L2/3 is implemented in the base station controller (BSC), distributed layer 2/3 is implemented in the base station subsystem (BTS) controller, and the different physical layer configurations are implemented in the BTS' modem. This invention does not preclude any other forms of implementation that realize the multi-carrier protocol structure proposed herein. The multi-mode physical layer consists of 1 to N carriers, where each of the carrier can be configured differently in terms modulation and coding schemes, as described in previous sections. Each of the carrier can also be configured differently in terms of the QoS or the set of QoSs it provides to the upper layers. The layer 2 protocol consists of the one or more Radio Link Protocols (RLPs) and one or more Medium Access Control (MAC) sublayer. Alternatively, QLP (QoS Link Protocol, to be described later), may be used instead of RLP. RLP provides transparent (no ARQ) or non-transparent (with ARQ) link layer control. The data plane of the MAC sublayer provides dynamic multiplexing and demultiplexing of layer 2 frames from one or more users or terminals to/from physical layer frames. The control plane of the MAC sublayer consists of a MAC state machine per user/terminal. The layer 3 protocol defines a set of signaling messages and signaling flows that controls the overall air-interface operations.

Layer 2/3 and Physical Layer Interface

Figure 24:
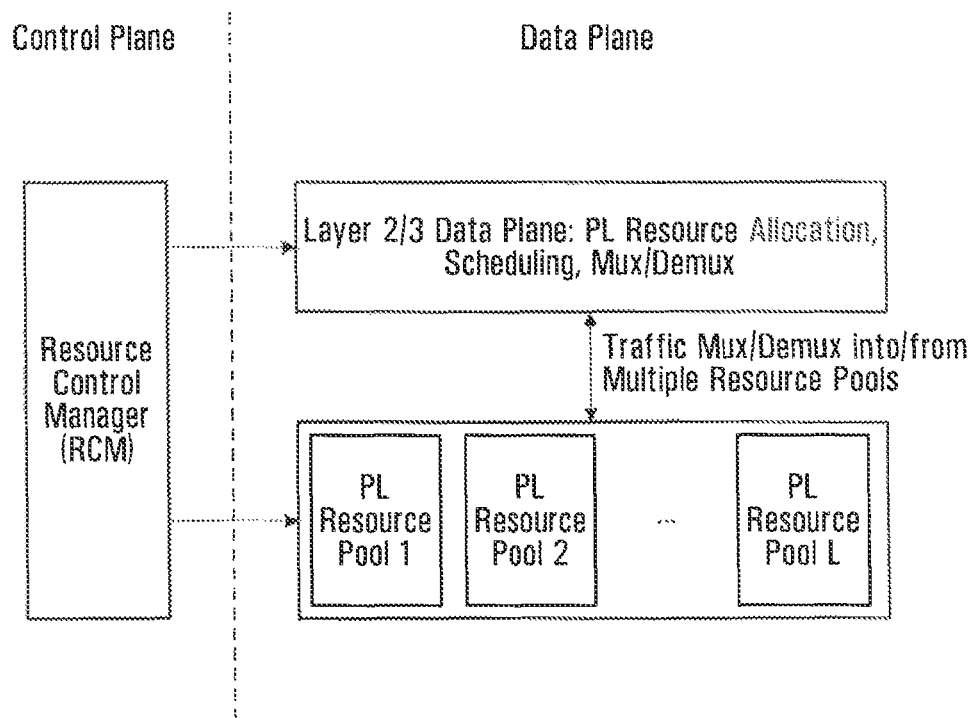
FIG. 24 is an example resource management interface between Layer 2/3 and Physical Layer

We propose the following protocol interface between layer 2/3 and physical layer, as shown in FIG. 24. The physical layer resource as presented to layer 2/3, is defined as consisting of a set of resource pools. Each of the resource pool is uniquely defined based on the following parameters:

Quality of service supported which may include, but not restricted to, data rate (minimum, maximum, mean), service type such as real-time or delay tolerant service List of manageable resources such as time slots, spreading codes, power, modulation and coding set Carrier identification Air-interface configuration, such as IS-95, 1 xRTT, 1xEV-DO or other new configurations Please note that one or more resource pools may reside on the same carrier. On the other hand, a resource pool may consist of multiple carriers. A mobile station can use one or more resource pools at any particular instance. Layer 2/3 performs fast and dynamic management of the physical layer resource, defined as a set of resource pools, to meet upper layers service requirements and resource availability at each pool. Resource availability of each pool can be dynamically affected by the loading and the forward link channel condition experienced by the mobile station at the particular pool. A centralized resource control performs call admission, slow quasi-static, time-of-day management of the pools' characteristics and boundaries.

The following describes one implementation of the resource pools configuration in the forward link:

Resource Pool #1:
primary carrier #1
1xRTT backward compatible
manageable resource Walsh codes, forward power
service characteristics: real-time voice service
Resource pool #2:
primary carrier #1
1xRTT backward compatible
manageable resource Walsh codes, forward power
service characteristics: real-time data service
Resource pool #3:
supplemental carrier #2
Non backward compatible. New physical layer (AMC etc.).
Manageable resource: time slots
service characteristic: delay tolerant service
Resource pool #4:
supplemental carrier #3
Non backward compatible. New physical layer (AMC etc.).
Manageable resource: time slots
service characteristic: delay tolerant service
QLP (ODS Link Protocol)

In additional to the traditional, backward compatible RLP, a new QLP is introduced: Each user typically has one QLP instance, although more than one QLP per user is also allowed.

Each QLP can support to up to 4 streams of user data/applications.

QLP accepts two types of data stream.

PPP over HDLC for efficient over the air delivery.

Individual IP packets. IP AL (filed separately) is used for zero padding and multiplexing small packets if needed.

QLP employs fixed size PDU, which can be N times of QLP Base_Size. The QLP Base_Size is small enough for efficient VoIP transmission.

QLP uses QLP packet count instead of data octets count as sequence number.

QLP may employ different ARQ mechanism (NAK or ACK) or no ARQ at all (for voice) for each stream of data.

Each QLP PDU carries a priority indicator. The value of this priority indicator is set according to a set of QoS requirements:

User's overall QoS class

Application's QoS requirements

Current data transmission condition (e.g., it could be a function of the number of QLP packets in the transmission buffer waiting for transmission or the average data throughput. The priority may be increased/decreased accordingly to maintain the data rate and/or packet delay)

Scheduler feedback (e.g., scheduler may request all QLP to lower the priority of its low QoS class packet when its resource is running tight)

Scheduling

The following dynamic management of physical layer resource at the base station is proposed:

Each user may have access to both dedicated channel(s) and shared channel(s). These channels may be power controlled or rate controlled.

For each packet, layer 2/3 decides which pool or pools it should be sent, based on call setup service configuration), and based on the packet's QoS priority.

The scheduler may actively manage the QoS priority for packets waiting in its transmission queues. And a packet originally assigned for shared channel transmission may be switch over for dedicated channel transmission if the packet has been waiting for too long or if the shared channel cannot meet its QoS requirement)

Layer 2/3 scheduler decides which packet should be sent based on the following parameters (please note that other parameters are not precluded by this disclosure):

time-to-live (applicable for pseudo-real-time service only)

relative users' priority (applicable for deployment scenario where 'absolute' QoS is not defined)

guaranteed minimum average data rate channel condition feedback from the mobile station the capacity cost of each RF channel Reverse Link In some implementations, MC-DV reverse link operates as following:

Active Mode

Reverse link frame size is 10 ms or 5 ms, in order to take advantage of multi-user diversity. It can't be too small because of no accurate time synchronization.

Before mobile station starts to transmit, it sends out R_DataRateRequest. Mobile station calculates R_DataRateRequest based on the its current pilot transmission power (since the reverse link is power controlled, the current transmission power basically acts as DRC feedback for base station), active set (for active set>1, the max_R_DataRateRequest is significantly restricted) and service needs.

Upon receiving the R_DataRateRequest, the base station grants the transmission of the mobile station at the next slot by sends out its MAC ID on RL_ASSIGNMENT_CH. The RL_ASSIGNMENT_CH may have more than one MAC ID at the same slot. (may use Qualcomm's idea for different long code mask instead of MAC ID) For mobile station in soft handoff, mobile will transmit if anyone base station assigns it.

During the transmission, a RL_RATE_CONTROL_CH controls the up/down of the transmission rate for each mobile station. For mobile in soft handoff, it use or of downs.

Retransmission

H-ARQ is employed on reverse link. RL_ARQ_CH is transmitted on the forward link to send ACK/NAK. Sub-code is used for incremental redundancy. RL_ARQ_CH, RL_RATE_CONTROL_CH and RL_ASSIGNMENT_CH can be combined into one RL_MAC_CH.

MAC State Machine

We propose the following overall MAC states for the control plane of each user: Active state, Standby state, Dormant state and Nun state. For 1xRTT terminals, the standby state will be bypassed.

Figure 25:
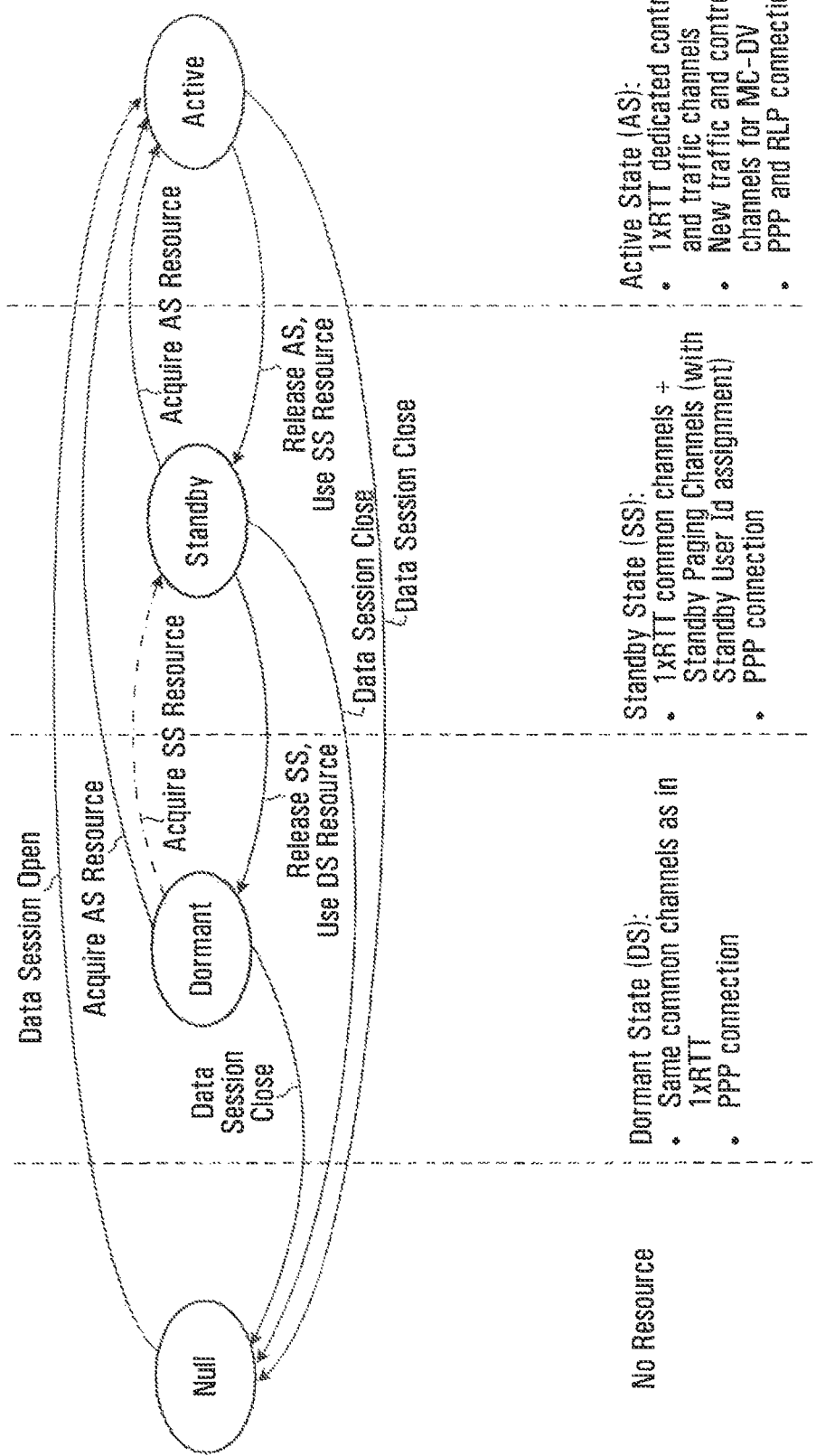
FIG. 25 is a diagram of example MAC states.
Figure 26:
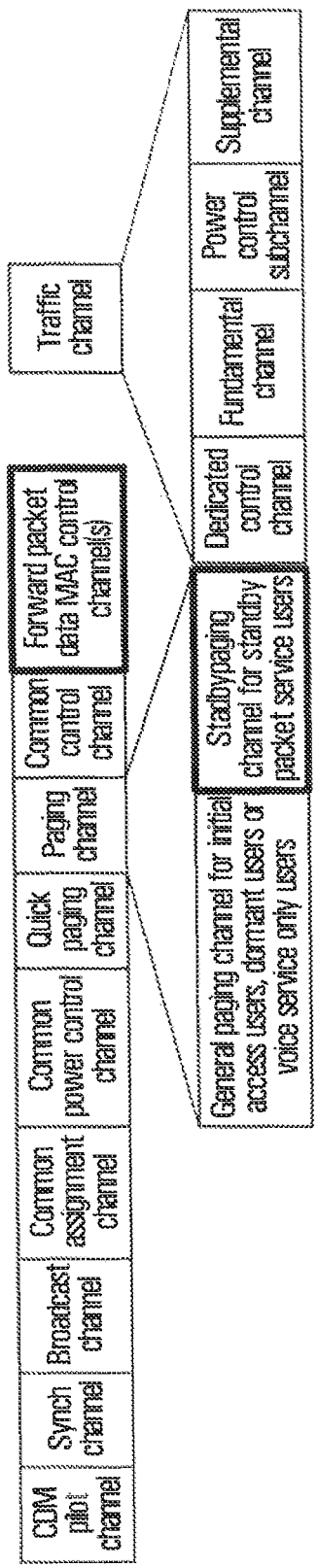
FIG. 26 is a diagram of example forward CDMA channels in the Primary Carrier.
Figure 27:
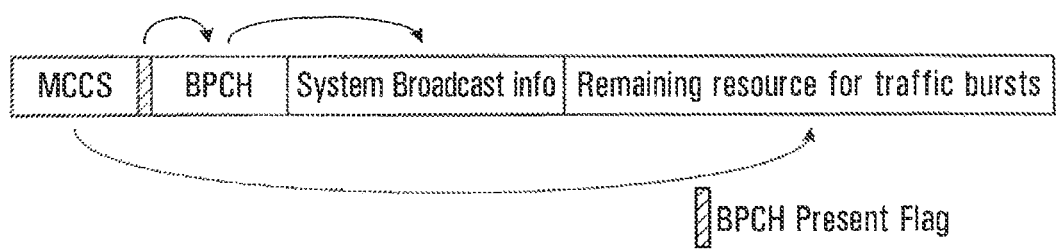
FIGS. 27-28 are diagrams of example frame configurations of Broadcast Pointer Channel (BPCH).
Figure 28:

To support the standby state in MC-DV system, the paging channels can be split into two groups (refer to FIG. 25). The first group which is the General Paging channels has the same functionality as in 1XRTT, to page users in dormant state. The second group which is the Standby Paging channel, is used to page standby state users only.

In the active state, the mobile monitors the dedicated or common control channel on the primary carrier for control information to receive data over the traffic channel(s) in the primary and/or supplemental carrier(s).

In the standby state, a mobile monitors Standby Paging channel periodically. In this state, a mobile monitors only the primary carrier for possible paging message. To support fast state transition, the monitoring cycle can be flexibly configured, e.g., 5ms, 10 ms, 20 ms, or K*20 ms (K is an integer number). To decrease interference of this Standby Paging channel, blind rate detection at the mobile or DTX mode can be supported. To decrease overhead caused by paging standby users, a short paging message is designed which includes a Standby user ill and a pointer. This pointer introduces the mobile to an appropriate control channel for subsequent resource assignment.

802.16M Control Framework

The application proposes the different aspects of control signaling mechanism between BS and MS to support system operation including system configuration, resource allocation/control, paging, MS network entry, power saving modes, multi-carrier operation. The proposed scheme allows reduced control overhead, enables power saving reduces MS processing requirements and enables MS fast network entry.

To reduce the broadcast control signaling overhead, we propose the BS to transmit static systemwide information, only when the BS detects that there is MS attempting to enter the network. There are two general types of static system wide information. One is essential physical layer configuration information that is needed for initial system access. Second is MAC/upper layer information that is not needed for initial system access. For the former, the BS has to broadcast the information once it detects that there is one or more MSs attempting network entry. For the latter, the BS unicasts the information the MS after the MS has performed mitial system access.

In order for the BS to detect if there is one or more MSs attempting to enter the network, the BS broadcast the uplink ranging (or random access) information periodically so that MS attempting network entry can decode such information and use it for transmitting up ink ranging (random access).

Since different types of control signaling, e.g. system configuration broadcast, paging, resource allocation/control, should be sent at different periodicity and some are event driven (e.g. paging information does not have to be sent if there is no MS to page), we propose to signal the presence of a particular type of control information using a Broadcast Pointer Channel (BPCH). An MS only needs to decode the BPCH to find out if it needs to decode subsequent control channels. This enable power saving. To further reduce overhead BPCH may not be present in every frame. We propose two options for MS to detect whether BPtH is present or not. One option is MS performs blind detection on the presence of BPCH. Second option is the presence of BPCH is indicated by a flag in the multicast control segment (MCCS), where MCCS is a segment that is already present in every frame for the purpose of resource allocation/control.

As it is critical for MS to receive system configuration information sent by the BS, we propose schemes to enable MS to track whether it has the most up to date system configuration information sent by the BS. The schemes proposed also enable power saving of MS in normal mode, sleep mode and Idle mode. We propose the overall MS network entry procedure based on the components listed above. For the case of multi-carrier deployment, a wideband MS can be instructed by the BS to monitor a subset of the carriers for control information, for power saving purpose, reduce processing requirements, as well as reduce system control signaling overhead. We propose primary and secondary carriers which carry different types of control information.

This contribution presents the types of control information required for 802.16m system operation including system access, transmission/reception of traffic packets, handover etc. Different types of control information has different characteristics in terms of the frequency of change, broadcast or unicast, robustness requirement, importance to initial system access, etc. Therefore, different types of control information should be treated differently. This contribution presents how each type of control information should be transmitted by the BS and received by the MS. A description of the MS network entry procedure as well as sleep mode operation are provided in terms of how the MS obtains the necessary control Information for proper operation. The support of multi-carrier operation is also described in terms of how MS monitors each carrier for the necessary control information.

Control Information in Legacy 16E System

In 16e, scheduling control information is sent in MAPs, while system information is sent in DCD/UCD. In addition, neighbor BS information and paging information are sent on broadcast MAC messages. Some of the information sent on MAPs are not necessary dynamic and therefore can be sent in less frequent manner to reduce overhead. E.g., STC zone switch IE, ranging region definition, fast feedback region definition. Some of the information in DCD/UCD are static system information, thus does not need to be periodically broadcast to MSs that have already entered the network or broadcast with a relatively long period to improve reliability. E.g., BS 10, operator 10, subnet 10, TDD ratio. Some of the information in DCD/UCD are semi-static system configuration information, thus does not need to be periodically broadcast to MSs that have already entered the network if the configuration hasn't been changed or broadcast with a relatively long period to improve reliability (e.g., burst profile, handover parameters). Similarly, neighbor BS information which is semi-static information does not need to be periodically broadcast to MSs that have already entered the network if the configuration hasn't been changed.

TABLE 1.1

TYPES OF DL CONTROL INFORMATION

| Control information type | Examples | Characteristics | Control channel design |
| --- | --- | --- | --- |
| 1) Essential static systemwide PHY information for decoding of OL PHY frames/subframes | Bandwidth configurations, CP sizes, multi-carrier configuration, system time, TOO ratio, guard tones. | Static system-wide deployment specific parameters. Required for fast initial access during network entry. MS should be able to decode these information after synchronization | Information should be broadcast either a) periodically or b) initial ranging event. If case a), these information should be carried in a fixed resource location within a superframe. In case b), the presence/absence of the information is signaled by a Broadcast Pointer Channel (BPCR). Information should be delivered with very high reliability. |
| 2) Essential pseudodynamic sector-wide PHY information for decoding of OL PHY frames/subframes (i.e., superframe configuration control information) | Channelization (partitioning of diversity zone, localized zone, pilot structure etc.), legacy/16 resource partition, subframe control configuration etc. Can contain initial ranging region/codes information for MS to do fast initial access | Information can change from one superframe to another. Required for fast initial access during network entry and handover. MS should be able to decode these information after synchronization and information in 1). | Information should be broadcast periodically every superframe. These information should be carried in a fixed resource location within a superframe. Information should be delivered with very high reliability. |

TABLE 1.1-continued

TYPES OF DL CONTROL INFORMATION

| Control information type | Examples | Characteristics | Control channel design |
|---|---|---|---|
| 3) Non-PRY system information | Procedure. BSID, operation ID, sub net ID etc | Static system information | Since information is static, it doesn't have to be periodically broadcast to MSs. It can be sent by unicast to a MS during initial network entry. These information does not have to be carried in fixed resource location. |
| 4) PRY/MAC system configuration information | Handover parameters, power control parameters, fast feedback region, ranging region etc. | Semi-static system configuration information, Configuration parameters values can change in a slow fashion (on order of seconds/minutes/hours). | For MS already entered the network, there is no need to broadcast the information in frequent configuration parameters, if the information hasn't changed. The control channel design should support efficient power saving for sleep mode and idle mode MS while ensuring any changes in the system configuration is received by the MS in timely fashion. For MS performing initial network entry, the system configuration information is sent as unicast message to the MS during network entry procedure to expedite the network entry. Note that BS has to already completed initial ranging procedure with MS. Details of the design to transmit this type of information is given in slides 10-12. |
| 5) Neighbor BS information | Information types 3) and 4) of neighbor BSs | As indicated in previous slide for type 3) and 4) | Information can be broadcast periodically or event triggered. The information can also be unicast to MS who wants to add a neighbor BS to the active set. |
| 6) Paging information | Quick paging and regular paging information | Non-periodic information. Event driven | Information should be broadcast whenever there is one or more MS to page. |
| 7) Dynamic DL and UL resource allocation and control information related traffic burst assignment | Burst assignment related information: MCS, MIMO mode, resource location, user ID ACK./NAK of UL traffic UL power control | Dynamically changes every sub-frame | Control information is unicast if the traffic burst is unicast. Control information is multicast/broadcast if the traffic burst is multicast/broadcast/ Resource location indication is multicast. |

Broadcast Pointer Channel (BPCH)

The broadcast of Information types (1), (3), (4), (5), (6) may or may not be present in a sub-frame or superframe boundary. To efficiently indicate the presence/absence of these information block, a 16m Broadcast Pointer Channel (BPCH) is introduced.

The 16m BPCH contains the following: information blocks presence flags, length of each information block that is present. Examples of information blocks are: System information, types (1); (3), (4), (5). In this information block, multiple MAC management messages for the different information types can be encapsulated. Paging information (type (6)) (either quick paging or full paging information).

One benefit of 16m BPCH is to allow sleep mode and idle mode MS to only decode the 16m BPCH to find out if broadcast information is present and whether the broadcast information present is relevant or not (e.g. paging information is not relevant to sleep mode MS). If the broadcast information is not present or the broadcast information not relevant, the MS can go back to sleep without the need to decode the rest of the sub-frame and the resource allocation/control information, i.e. type (7). If the broadcast information is present and relevant, the MS just needs to decode the relevant broadcast information and go back to sleep without the need to decode the rest of the sub-frame and the resource allocation control information, i.e. type (7).

BPCH mayor may not be present in each sub-frame. There are two options of how the presence of BPCR can be detected. Option 1: A 'BPCH present' flag is added to the multicast control segment (MCCS) to indicate the presence/absence of the BPCH. Note that MCCS contains control information to indicate the partitioning of resource within a frame for traffic bursts. MCCS is of fixed length and modulation/coding (refer to contribution NNN for details). An MS first decodes the MCCS. If the 'BPCH present' flag is set to '1' (i.e. BPCH is present), the MS will decode the BPCH. The length and modulation/coding of BPCH is fixed. The information contained in BPCH will allow the MS to decode the system broadcast information that follows. The remaining resource in the sub-frame is for traffic burst and the partitioning of those resources is signaled by the MCCS. If the 'BPCH present' flag is set to '0' (i.e. BPCH is not present), the MS will know that both BPCH and system broadcast information are not present. The remaining resource in the sub-frame is for traffic bursts, and the partitioning of those resources is signaled by the MCCS. Option 2: If present, BPCH is located at fixed location in a sub-frame. It has fixed length and modulation/coding. MS performs blind detection to decide if BPCH is present or not. An MS first attempts to decode BPCH. If decoding successful, the information contained in BPCH will allow the MS to decode the system broadcast information that follows. The remaining resource in the sub-frame contains the MCCS and resource for traffic bursts. The partitioning of the resource for traffic burst is signaled by the MCCS. Note that MCCS is of fixed length and modulation/coding. If MS does not successfully decode the BPCH, the MS will assume that both BPCH and the system broadcast information are not present. The MS proceeds to decode the MCCS and the rest of traffic burst if applicable.

Transmission of System Configuration Information

As this type of information is semi-static and can change, the BS has to inform the MS in a timely manner when the information changes while enabling power saving of MS. In one implementation, a 'system configuration change count (SCCC)' is included in the system configuration broadcast messages sent from the BS. It is used to indicate the version number of the associated system configuration information. An action timer is included in the system configuration-broadcast messages to indicate when the associated system configuration takes effect. Overall, an MS stores up to two sets of SCCC values and corresponding system configuration information in its memory. One is the SCCC value and corresponding system configuration information currently in effect. The other is the SCCC value and corresponding system configuration information that will take effect at a specific action time. BS transmits a SCCC and a 'system configuration change alert (SCCA), flag periodically in a frequent manner. For example, every superframe as part of the super-frame configuration control information, i.e. type (2). The SCCC is used to indicate the version number of the system configuration information currently in effect. The SCCA flag is used to indicate if BS has broadcast new system configuration information than those associated with the current SCCC.

By detecting the SCCC value, the MS knows the current version of the system configuration information in effect and therefore can configure itself accordingly if the MS has previously received the corresponding system configuration broadcast messages. By detecting the SC A flag, the MS knows if BS has broadcast new system configuration information. If the flag is set to '1' 1 the MS will try to decode the system configuration broadcast messages in current and subsequent subframes until It has successfully decoded the information. •If MS has detected an SCCC value from the BS that is different from the SCCC value(s) the MS has stored, the MS shall cease UL transmission and attempt to decode system configuration broadcast messages from the BS in the downlink. The MS shall only resume UL transmission after it has successfully decoded the system configuration broadcast messages that contain the SCCC value. •To support power saving for MS in normal/active mode: •If MS has detected that SCCC value has not changed and SCCA flag is set to '0', the MS does not need to decode the system configuration broadcast messages indicated in the BPCH •If MS has detected that SCCC value has not changed and SCCA flag is set to '1' and if the MS has previously successfully decoded the system configuration broadcast messages with new SCCC value, the MS does not need to decode the system configuration broadcast messages indicated by the BPCH •If MS has detected that SCCC value has not changed and SCCA flag is set to '1' and if the MS has not previously successfully decoded the system configuration broadcast messages with new SCCC value, the MS has to decode the system configuration broadcast messages indicated by the BPCH.

To support power saving for MS in sleep mode or idle mode: BS periodically transmit the system broadcast information. MS in sleep mode or idle mode wakes up periodically (with period configured by the BS) to attempt to decode the SCCC/SCCA sent in the superframe configuration control information. The wake-up time of the MS should co-inside with the time when the SCCC and SCCA is broadcast by the BS. If the MS detects that SCCC has changed and the value is not the same as what it stores in the memory the MS shall be awake in this subframe and subsequent sub-frames to decode DPCH and the system broadcast information until it has successfully decode system configuration broadcast messages from the BS that contains the SCCC value. If the MS detects that SCCC has not changed but SCCA flag is set to '1' and the MS has not previously received system configuration broadcast messages from BS that contains a new SCCC value, the MS shall be awake in this subframe and subsequent sub-frames to decode BPCH and the system broadcast information until it has successfully decode system configuration broadcast messages from the BS that contains a new SCCC value If the MS detects that SCCC has not changed and SCCA flag is set to '0', the MS can go back to sleep (if it is in sleep window or paging unavailable interval) without the need to decode the subsequent sub-frames.

Initial Network Entry Procedure at MS

There are two methods for MS network entry procedures which correspond to the two options for the type (1) in Table 1.1. Method 1 is based on option (1a) of type (1) information: MS synchronizes with sync channel/preamble. MS decodes information type (1). MS decodes information type (2). MS performs UL ranging procedure based on the ranging region information given in information type (2). MS obtains type (3) and type (4) information through unicast signaling from the BS, transmitted on DL PHY sub-frames.

Method 2 based on option (1b) of type (1) information: MS synchronizes with sync channel/preamble. MS decodes information type (2) and obtain the ranging region information. MS performs UL ranging procedure based on the ranging region information given in information type (2). BS detects the MS ranging attempt, and BS transmits the information type (1). MS decodes the information type (1). MS continues the ranging procedure. MS obtains type (3) and type (4) information through unicast signaling from the BS, transmitted on the DL PHY frames.

Multi-Carrier Support

In the case of contiguous spectrum, multi-carrier mode is used to support MSs with different bandwidth capability. For example, a 10 MHz spectrum can be divided into two 5 MHz carriers in order to simultaneously support MSs with 5 MHz bandwidth capability and 10 MHz bandwidth capability. Not all the carriers need to carryall the system broadcast information as system-wide and sector-wide system Information are common to all carriers. Repeating the information over multiple carriers increases the overhead. Two types of carriers can be defined: e Primary carrier: this is a carrier that carries the synchronization channel (or preamble), all the system information, neighbor BS information, paging information and resource allocation/control information, i.e information type (1) to type (7) described in slides 3-5. Secondary carrier: this is a carrier that carries a subset of the system information, i.e, information type (2) for information related to superframe configuration on that carrier; as wen as the resource allocation/control information of each sub-frame within the carrier, i.e. type (7). This type of carrier may also carry the synchronization channel (or preamble).

One or multiple carriers within the spectrum can be designated as primary carriers. One or multiple carriers within the spectrum can be designated as secondary carriers. A narrowband MS, i.e. an MS that has bandwidth capability to transmit/receive on only one carrier at a time, is assigned for a primary carrier. A wide band MS, i.e., an MS that has bandwidth capability to transmit/receive on multiple carriers at a time, is assigned to one or multiple primary carriers. A wideband MS monitors only the assigned primary carrier(s) for system broadcast information, i.e. type (1) to type (6), and resource allocation/control information, i.e. type (7), for new traffic packet transmission. The wideband MS also monitors secondary carrier(s) for superframe configuration broadcast information, i.e. type (2) at the superframe boundary. The MS may monitor the resource allocation/control information, i.e. type (7), on secondary carrier(s) for HARQ retransmissions. Details of HARQ ACK/NAK and retransmission for multi-carrier operation is given in other appendices.

The above-described embodiments of the present application are intended to be examples only. Those of skill in the art may effect alterations, modifications and variations to the particular embodiments without departing from the scope of the application.

The invention claimed is:

1. A method of a subscriber station (SS) comprising:
performing network entry in a multi-carrier wireless environment using a primary carrier;
receiving timing information corresponding to the primary carrier;
receiving a first control signaling via the primary carrier, the first control signaling assigning a first secondary carrier;
transmitting uplink data via the first secondary carrier using an uplink transmission timing of the first secondary carrier, the uplink transmission timing of the first secondary carrier being the same as an uplink transmission timing of the primary carrier;
receiving a second control signaling via the primary carrier, the second control signaling assigning a second secondary carrier without modifying the primary carrier; and
transmitting uplink data via the second secondary carrier using an uplink transmission timing of the second secondary carrier, the uplink transmission timing of the second secondary carrier being the same as an uplink transmission timing of the primary carrier.

2. The method of claim 1, wherein the primary carrier corresponds to the carrier used for network entry.

3. The method of claim 1, wherein the primary carrier is used by the SS for synchronization.

4. The method of claim 1, further comprising receiving a third control signaling via the primary carrier, the third control signaling changing the primary carrier.

5. The method of claim 1, wherein the primary carrier carries voice information.

6. The method of claim 5, wherein the primary carrier carries real-time services to a user of the SS.

7. The method of claim 6, wherein the first secondary carrier provides data services to a user of the SS.

8. The method of claim 7, wherein the primary carrier is code division multiplexed.

9. The method of claim 8, wherein the first secondary carrier is time division multiplexed.

10. The method of claim 1, wherein the SS is responsive to a control signal sent from a base station (BS) over the primary carrier to trigger an UL transmission on the first secondary carrier.

11. An apparatus comprising:
a transceiver; and
a processor configured to:
perform network entry of a subscriber station (SS) in a multi-carrier wireless environment using a primary carrier;
receive timing information corresponding to the primary carrier;
receive a first control signaling via the primary carrier, the first control signaling assigning a first secondary carrier;
transmit uplink data via the first secondary carrier using an uplink transmission timing of the first secondary carrier, the uplink transmission timing of the first secondary carrier being the same as an uplink transmission timing of the primary carrier;
receive a second control signaling via the primary carrier, the second control signaling assigning a second secondary carrier without modifying the primary carrier; and
transmit uplink data via the second secondary carrier using an uplink transmission timing of the second secondary carrier, the uplink transmission timing of the second secondary carrier being the same as an uplink transmission timing of the primary carrier.

12. The apparatus of claim 11, wherein the primary carrier corresponds to the carrier used for network entry.

13. The apparatus of claim 11, wherein the primary carrier is used by the SS for synchronization.

14. The apparatus of claim 11, the processor further configured to receive a third control signaling via the primary carrier, the third control signaling changing the primary carrier.

15. The apparatus of claim 11, wherein the primary carrier carries voice information.

16. The apparatus of claim 15, wherein the primary carrier carries real-time services to a user of the SS.

17. The apparatus of claim 16, wherein the first secondary carrier provides data services to a user of the SS.

18. The apparatus of claim 17, wherein the primary carrier is code division multiplexed.

19. The apparatus of claim 18, wherein the first secondary carrier is time division multiplexed.

20. The apparatus of claim 11, wherein the SS is responsive to a control signal sent from a base station (BS) over the primary carrier to trigger an UL transmission on the first secondary carrier.

21. A system comprising:
a base station; and
a subscriber station (SS) configured to:
perform network entry in a multi-carrier wireless environment using a primary carrier;
receive, from the base station, timing information corresponding to the primary carrier;

receive, from the base station, a first control signaling via the primary carrier, the first control signaling assigning a first secondary carrier; and transmit, to the base station, uplink data via the first secondary carrier using an uplink transmission timing of the first secondary carrier, the uplink transmission timing of the first secondary carrier being the same as an uplink transmission timing of the primary carrier;

wherein the base station is configured to:

evaluate a suitability of the first secondary carrier periodically; and transmit, based on the evaluation, to the SS, a second control signaling via the primary carrier, the second control signaling assigning a second secondary carrier without modifying the primary carrier; and wherein the SS is further configured to:

receive, from the base station, the second control signaling via the primary carrier; and transmit, to the base station, uplink data via the second secondary carrier using an uplink transmission timing of the second secondary carrier, the uplink transmission timing of the second secondary carrier being the same as an uplink transmission timing of the primary carrier.

22. The system of claim 21, wherein the base station is further configured to determine that a change of the first secondary carrier is needed based on the evaluation.

* * * * *